US010171459B2

(12) United States Patent
Sakemi et al.

(10) Patent No.: US 10,171,459 B2
(45) Date of Patent: Jan. 1, 2019

(54) METHOD OF PROCESSING A CIPHERTEXT, APPARATUS, AND STORAGE MEDIUM

(71) Applicant: FUJITSU LIMITED, Kawasaki-shi, Kanagawa (JP)

(72) Inventors: Yumi Sakemi, Kawasaki (JP); Ikuya Morikawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 165 days.

(21) Appl. No.: 15/283,803

(22) Filed: Oct. 3, 2016

(65) Prior Publication Data
US 2017/0104752 A1    Apr. 13, 2017

(30) Foreign Application Priority Data
Oct. 13, 2015    (JP) .................................. 2015-202197

(51) Int. Cl.
| H04L 29/06 | (2006.01) |
| H04L 9/00 | (2006.01) |
| H04L 9/06 | (2006.01) |
| H04L 9/32 | (2006.01) |

(52) U.S. Cl.
CPC .......... H04L 63/0861 (2013.01); H04L 9/008 (2013.01); H04L 9/0618 (2013.01); H04L 9/3231 (2013.01)

(58) Field of Classification Search
CPC .... H04L 63/0861; H04L 9/0618; H04L 9/008
See application file for complete search history.

(56) References Cited

U.S. PATENT DOCUMENTS

| 2006/0291661 A1* | 12/2006 | Ramzan ................. H04L 9/0844 380/277 |
| 2010/0329448 A1 | 12/2010 | Rane et al. |
| 2012/0207299 A1 | 8/2012 | Hattori et al. |
| 2012/0300936 A1* | 11/2012 | Green ................... H04L 9/3073 380/278 |

(Continued)

FOREIGN PATENT DOCUMENTS

| JP | 2009-129292 | 6/2009 |
| JP | 2011-13672 | 1/2011 |
| WO | 2011/052056 | 5/2011 |

OTHER PUBLICATIONS

Gentry, "Fully Homomorphic Encryption Using Ideal Lattices", STOC '09 Proceedings of the forty-first annual ACM symposium on Theory of computing, pp. 169-178 (10 pages), May 31-Jun. 2, 2009.

(Continued)

*Primary Examiner* — Mahfuzar Rahman
(74) *Attorney, Agent, or Firm* — Fujitsu Patent Center

(57) ABSTRACT

A method of processing a ciphertext, the method includes: acquiring a part of a plurality of encrypted elements included in the ciphertext, each of the plurality of encrypted elements being an encrypted element in which values of a plurality of elements in a multidimensional determination target vector are respectively encrypted by homomorphic encryption; decrypting the acquired part of the plurality of encrypted elements; and determining validity of the determination target vector based on a relationship between at least one value obtained by the decrypting and both of 0 and 1.

12 Claims, 11 Drawing Sheets

(56) References Cited

U.S. PATENT DOCUMENTS

| | | | | |
|---|---|---|---|---|
| 2013/0014270 A1* | 1/2013 | Sy | ............................ | H04L 9/008 |
| | | | | 726/26 |
| 2013/0318351 A1* | 11/2013 | Hirano | .................. | H04L 9/3073 |
| | | | | 713/168 |
| 2014/0208101 A1* | 7/2014 | Naganuma | .............. | G06F 21/60 |
| | | | | 713/164 |
| 2014/0325230 A1* | 10/2014 | Sy | ............................ | G06F 21/32 |
| | | | | 713/171 |
| 2016/0182222 A1* | 6/2016 | Rane | ....................... | H04L 9/008 |
| | | | | 713/168 |

OTHER PUBLICATIONS

Boneh et al., "Evaluating 2-DNF Formulas on Ciphertexts", Theory of Cryptography, vol. 3378 of the series Lecture Notes in Computer Science, pp. 325-341 (17 pages), Feb. 2005.

Okamoto et al., "Homomorphic Encryption and Signatures from Vector Decomposition", Pairing 2008, LNCS 5209, Springer-Verlag, pp. 57-74 (18 pages), Sep. 2008.

Hirano et al., "Cryptographically-Secure and Efficient Remote Cancelable Biometrics Based on Public-Key Homomorphic Encryption", IWSEC 2013, LNCS 8231, Springer-Verlag, pp. 183-200 (18 pages), Nov. 2013.

* cited by examiner

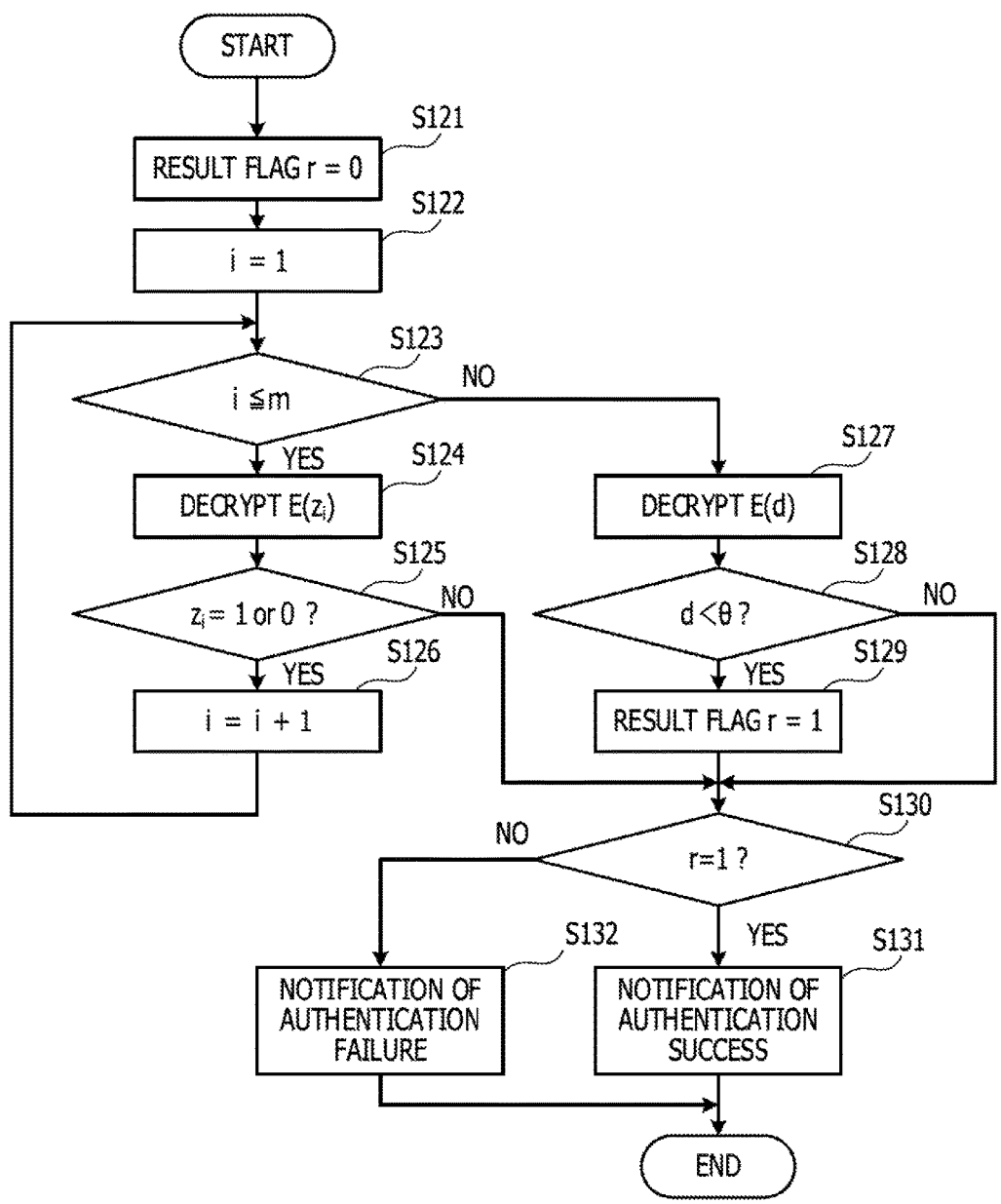

METHOD OF PROCESSING A CIPHERTEXT, APPARATUS, AND STORAGE MEDIUM

CROSS-REFERENCE TO RELATED APPLICATION

This application is based upon and claims the benefit of priority of the prior Japanese Patent Application No. 2015-202197, filed on Oct. 13, 2015, the entire contents of which are incorporated herein by reference.

FIELD

The embodiments discussed herein are related to a method of processing a ciphertext, an apparatus, and a storage medium.

BACKGROUND

In recent years, the development and widespread use of techniques related to computing machines and networks has been increasing the importance in data (personal data) related to the attribute and the behavior of individuals and confidential data of organizations such as corporations. The utilization of the personal data and the confidential data using computation and analysis allows unprecedented new finding to be obtained or a new function to be implemented. Meanwhile, the risk in which the privacy of the individual or the secret of the organization is invaded is regarded as a problem. Therefore, an attention is focused on concealment techniques that allow the personal data or the confidential data to be utilized while being protected. Among the concealment techniques, a homomorphic encryption technique is a concealment technique using an encryption technique. The homomorphic encryption technique is one of public key encryption methods in which a pair of different keys is used in the encryption and in the decryption, and is capable of operating data while the data remains encrypted.

Generally, the homomorphic encryption method conducts an operation corresponding to addition, multiplication, or the like on two or more target ciphertexts without decrypting the ciphertexts, and thus is capable of obtaining ciphertexts that are computation results by conducting addition, multiplication, or the like on their original plain texts. For example, a fully homomorphic encryption method is proposed in which addition and multiplication may be conducted at any number of times. The fully homomorphic encryption method is capable of implementing an operation, such as exclusive OR, AND, and NOT, thereby allowing computations by all kinds of logic circuits to be implemented. Meanwhile, the fully homomorphic encryption method is not practical in performance at present because of the enormous time for the processing such as encryption and decryption, concealment computation or the enormous size of the ciphertexts. Therefore, a somewhat homomorphic encryption technique is proposed that implements a practical performance by limiting the number of multiplications.

One of the applications of the homomorphic encryption is biometric authentication. The biometric authentication performs authentication that a user is an authentic person using biometric information on the user, has an advantage that the user does not have to store a password compared with password authentication. Meanwhile, the biometric information on a user is unchanged through life, and is not capable of being changed and destroyed. Accordingly, there arises a problem of protection against a leakage of the biometric information. In view of this, it is considered that the homomorphic encryption is used for biometric authentication, thereby allowing the degree of similarity to be derived without using a feature vector of a plain text, and safe authentic person authentication with a low possibility of a theft of the plain text to be implemented.

As examples of conventional techniques, the following are known: International Publication Pamphlet No. 2011/052056; C. Gentry, "Fully Homomorphic encryption using ideal Lattices", STOC '09 Proceedings of the forty-first annual ACM symposium on Theory of computing, 2009 May 31, pp. 169-178; D. Boneh, E-J. Goh, and K. Nissim, "Evaluating 2-DNF Formulas on Ciphertexts", Theory of Cryptography, Volume 3378 of the series Lecture Notes in Computer Science, February 2005, pp. 325-341; T. Okamoto, and K. Takashima, "Homomorphic encryption and Signatures from Vector Decomposition", Pairing 2008, LNCS 5209, Springer-Verlag, September 2008, pp. 57-74; and, T. Hirano, M. Hattori, T. Ito, and N. Matsuda, "Cryptographically-Secure and Efficient Remote Cancelable Biometrics Based on Public-Key Homomorphic encryption", IWSEC 2013, LNCS 8231, Springer-Verlag, November 2013, pp. 183-200.

SUMMARY

According to an aspect of the invention, a method of processing a ciphertext, the method includes: acquiring a part of a plurality of encrypted elements included in the ciphertext, each of the plurality of encrypted elements being an encrypted element in which values of a plurality of elements in a multidimensional determination target vector are respectively encrypted by homomorphic encryption; decrypting the acquired part of the plurality of encrypted elements; and determining validity of the determination target vector based on a relationship between at least one value obtained by the decrypting and both of 0 and 1.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a flowchart illustrating one example of a processing procedure in the authentication server.

DESCRIPTION OF EMBODIMENTS

Figure 1:
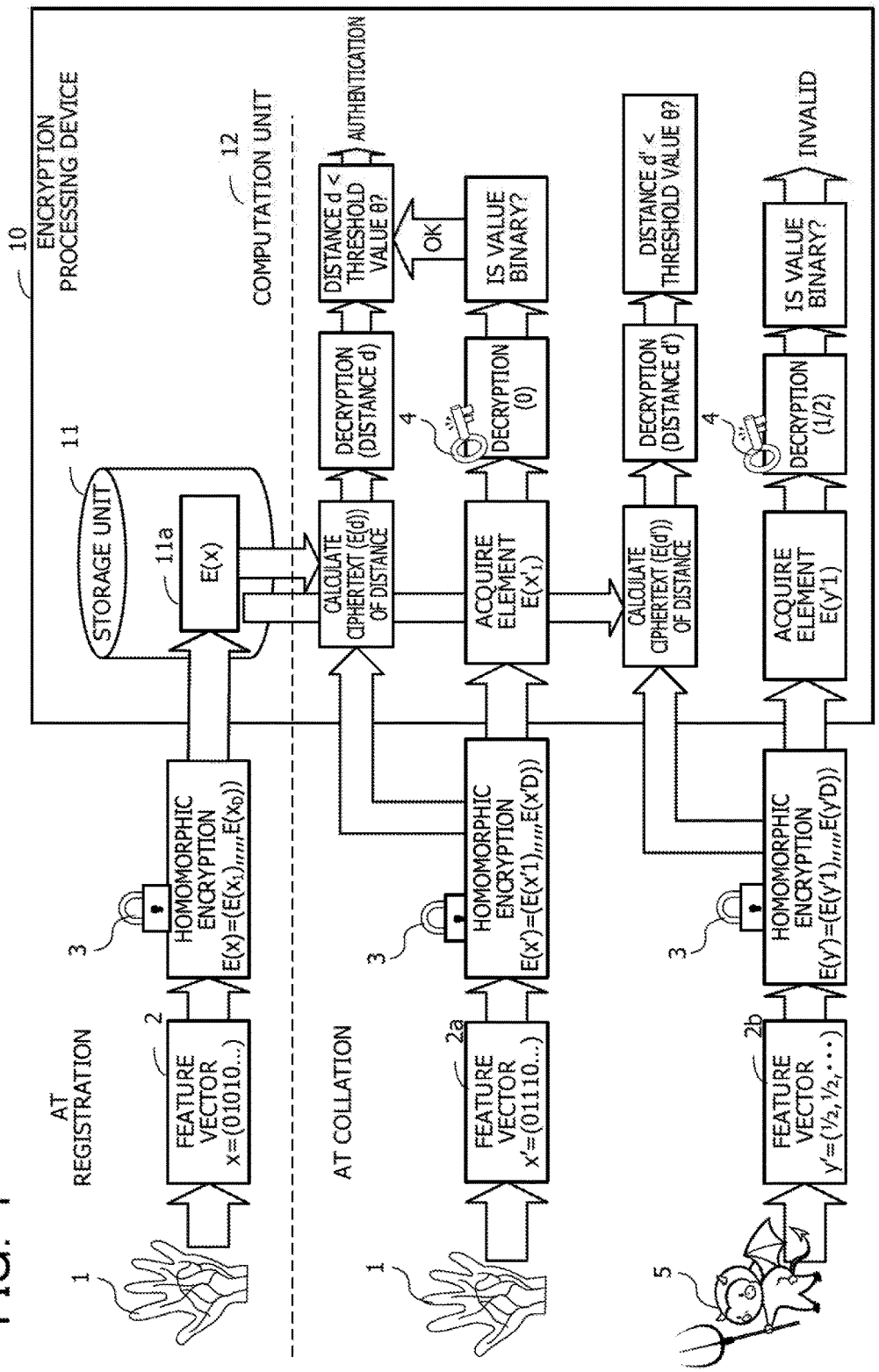
FIG. 1 illustrates a function configuration example of a device according to a first embodiment.

In biometric authentication, a feature vector is generated based on biometric information on a user, and the feature vector is encrypted by a homomorphic encryption method. The encryption data encrypted by the homomorphic encryption method is registered as a template with a calculation server. Thereafter, when user authentication is conducted, a calculation server calculates, for example, an Euclidean squared distance between encryption data of a feature vector generated based on biometric information on a user and the template while the encryption data being unchanged. A calculation result is sent to an authentication server. The authentication server decrypts the calculation result, and a success or a failure of the authentication is determined based on a distance obtained by the decryption.

Note that, in the biometric authentication, the feature vector includes an error resulting from the difference in environments or the difference in positions when biometric information is read. Accordingly, even for an authentic person, a registration-use feature vector and a collation-use feature vector do not entirely match. Therefore, an error is allowable to some extent when a determination is made. An authentication success is determined if an error indicated by the Euclidean squared distance is less than a threshold value, for example.

In such the biometric authentication, a binary code (0 or 1) is used as a feature vector in some cases. The use of a binary code as a feature vector arises a problem of allowing an attack that acquires an original feature vector from an encrypted feature vector without using a secret key with respect to an arbitrary user.

When the number of elements in a feature vector is set to D (D is an integer of 4 or more), for example, a threshold value of a distance for the biometric authentication is greater than D/4 in many cases. For example, when D is divisible by 4, an input of a collation-use feature vector in which the value of each of all the elements is ½ by a malicious user results in an Euclidean squared distance D/4 $(=(½)^2 \times D)$, independent of the values of the elements in the template. In this case, the distance is less than a threshold value, so that the authentication is succeeded. Data with which the spoofing with respect to an arbitrary user is possible is called wolf.

In addition, in a case where the spoofing is possible, when the values of elements of a predetermined number in a spoofing-use feature vector is set to values other than "½", and an Euclidean squared distance is arbitrarily adjusted, the value of a specific element in a feature vector that is used when the template is registered may be distinguished, based on an authentication result. The values of all the elements in a feature vector that is used when the template is registered are distinguished to result in the reproduction of the feature vector.

In this manner, the conventional biometric authentication technique using the homomorphic encryption is inadequate for the safety against the attack from the malicious user.

In one aspect, the present application aims to increase the safety against an invalid action.

Hereinafter, embodiments are described in details with reference to the drawings. Note that, the respective embodiments may be implemented by combining the multiple embodiments within a range where no contradiction occurs.

First Embodiment

Firstly, a first embodiment will be described. The first embodiment relates to biometric authentication using the homomorphic encryption method that protects against an attack due to an input of an invalid homomorphic ciphertext.

FIG. 1 illustrates a function configuration example of a device according to the first embodiment. In the first embodiment, an encryption processing device 10 conducts biometric authentication. The encryption processing device 10 includes a storage unit 11 and a computation unit 12.

The storage unit 11 stores therein a template 11a for authentication. The template 11a is a ciphertext (comparison target ciphertext) of a feature vector 2 (comparison target vector) in which a feature of biometric information on a specific person is represented by multiple elements each having a value of 0 or 1, and includes multiple encrypted elements in which the respective elements are encrypted to homomorphic ciphertexts. For example, elements in the feature vector 2 indicating a feature of a vein pattern in a palm 1 of a user are encrypted to homomorphic ciphertexts with a public key 3 of the user, and an encryption vector (homomorphic encryption vector) including the encrypted elements that have been encrypted are stored in the storage unit 11, as the template 11a.

When an authentication request including a ciphertext (determination target ciphertext) is inputted, the computation unit 12 performs user authentication by comparing the ciphertext with the template 11a. For example, when an authentication request is inputted, the authentication request including a ciphertext in which elements in a feature vector 2a (determination target vector) generated from a vein pattern in the palm 1 by an authorized user are encrypted to homomorphic ciphertexts.

When an authentication request including a ciphertext is inputted, the computation unit 12 acquires a part of the encrypted elements from the ciphertext. The computation unit 12 selects encrypted elements of a predetermined number in a random manner, from the multiple encrypted elements, and acquires the selected encrypted elements, for example. The computation unit 12 then decrypts the acquired part of the encrypted elements.

When at least one value obtained by the decryption of the part of the encrypted elements is a value other than 0 and 1, the computation unit 12 determines that a value of the feature vector 2a, 2b having been used for the generation of the inputted ciphertext is invalid.

Further, when an authentication request including a ciphertext is inputted, the computation unit 12 generates an encrypted distance based on the ciphertext and the template 11a. The encrypted distance is a ciphertext of a distance between the feature vector 2a, 2b having been used for the generation of the collation-use ciphertext and the feature vector 2 having been used for the generation of the template 11a. The distance is, for example, an Euclidean squared distance. The computation unit 12 decrypts the ciphertext of the distance, and generates a value indicating the distance.

If the value indicating the distance is less than a threshold value θ, and each of all the values obtained by the decryption of a part of the encrypted elements is 0 or 1, the computation unit 12 determines that the feature vector having been used for the generation of the inputted ciphertext represents the feature of the biometric information on the authorized user. In other words, the computation unit 12 causes the authentication to be succeeded.

For example, as for a ciphertext E(x') that is generated from the feature vector 2a indicating the feature of the vein pattern in the palm 1 of the authorized user, a distance d is less than the threshold value θ with a high probability. Further, a value obtained by the decryption of each encrypted element that is extracted from the ciphertext E(x')

is a binary of "0" or "1". As a result, an authentication success is determined in the computation unit 12.

On the other hand, if the value indicating the distance is greater than or equal to the threshold value θ, or at least one of the values obtained by the decryption of the encrypted elements to be determined is a value other than 1 and 0, the computation unit 12 determines that the feature vector having been used for the generation of the inputted ciphertext is different from the feature of the biometric information on the authorized user. In other words, the computation unit 12 causes to the authentication to be failed.

For example, for a purpose of spoofing, the feature vector 2b in which the value of each of all the elements is "½" is inputted in some cases. When the number of elements is D (D is an integer of 1 or more), an Euclidean squared distance between the feature vector 2b in which the value of each of all the elements is "½" and the template 11a is "D/4", and if the threshold value θ for the success or failure determination is greater than "D/4", a distance d' is less than the threshold value θ. However, the computation unit 12 decrypts an arbitrary encrypted element in a ciphertext E(y') that is generated using the feature vector 2b to obtain a value of "½". As a result, an authentication failure is determined in the computation unit 12.

In this manner, the encryption processing device 10 protects against an attack by an attacker 5 using the invalid feature vector 2b. As a result, the safety against the invalid action is improved.

Note that, even when the feature vector 2b aiming at the spoofing includes a binary element, the distance is less than the threshold value θ in some cases depending on the value of the threshold value θ. To reliably suppress the spoofing, encrypted elements the number of which is in accordance with the value of the threshold value θ are decrypted, and whether the value of each decrypted element is a binary may be determined. In this case, the computation unit 12 decrypts encrypted elements the number of which is greater by one than the maximum number of binary elements that may be included in a feature vector aiming at the spoofing. For example, when the number of elements in a multidimensional vector is D (D is an integer of 1 or more), the computation unit 12 acquires and decrypts, in accordance with the value of the threshold value θ, encrypted elements the number of which corresponds to an minimum integer greater than (4θ−D)/3. This protects against a masquerade attack.

Moreover, attacks on the authentication system include, in addition to the spoofing, an attack aiming at the acquisition of the feature vector 2 having been used for the generation of the template 11a. For example, considered is an attack of inputting a ciphertext based on a feature vector in which the value of one element (acquisition target element) is a value greater than "1", each value of three elements is "0", and each value of the other elements is "½", into the encryption processing device 10. In this case, a success or a failure of the authentication is changed depending on the value of an element corresponding to an acquisition target element in the feature vector 2. Therefore, the value of an element corresponding to the acquisition target element in the feature vector 2 may be determined based on whether the authentication is succeeded or not. Repeating the attack on all the elements as acquisition target elements in the feature vector in sequence allows the acquisition of the entire feature vector 2 having been used for the generation of the template 11a. To avert such attack, the computation unit 12 acquires and decrypts four encrypted elements from the inputted ciphertext. The computation unit 12 then determines that an invalid attack is performed when at least one of the values of the decrypted elements is a value other than a binary, and that the authentication is a failure. With this, the acquisition of the feature vector 2 is suppressed.

Note that, a method of attacking on the authentication system using the homomorphic encryption, and the number of encrypted elements that are decrypted for protecting against the attack will be described in details in a second embodiment.

Moreover, the computation unit 12 may be implemented by, for example, a processor included in the encryption processing device 10. The storage unit 11 may be implemented by, for example, a memory or a storage device included in the encryption processing device 10.

Second Embodiment

Next, the second embodiment will be described. In the second embodiment, a template corresponding to biometric information on a user, and a secret key are managed in different devices, thereby increasing the safety.

Figure 2:
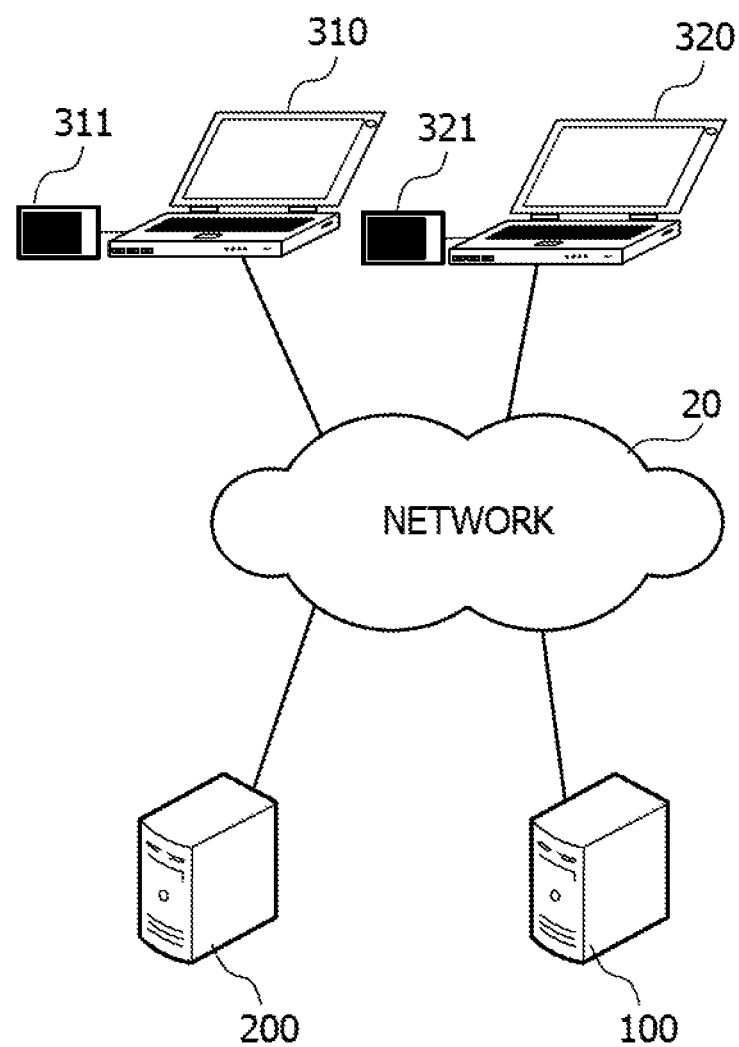
FIG. 2 illustrates a configuration example of an authentication system according to a second embodiment.

FIG. 2 is a diagram illustrating a configuration example of an authentication system in the second embodiment. Multiple terminal devices 310 and 320, a calculation server 200, and an authentication server 100 are coupled to one another via a network 20.

Each of the multiple terminal devices 310 and 320 is a computer used by a user who knows his/her public key. The multiple terminal devices 310 and 320 respectively include sensors 311 and 321 for biometric authentication. Each of the sensors 311 and 321 is a sensor that takes an image of a vein pattern in a palm, for example. Each of the sensors 311 and 321 irradiates the palm that is held over each of the sensors 311 and 321 with near-infrared rays, and receives the reflected near-infrared rays, for example. The vein pattern is darkly projected on a video image obtained by receiving the reflected near-infrared rays. The vein patterns are different from one to another person, so that the collation of the vein pattern allows the authentic person to be identified. Note that, the biometric information may be information other than information on a palm vein. For example, various types of biometric information, such as a finger vein, fingerprints, irises, and a voice, may be used as the biometric authentication.

Each of the terminal devices 310 and 320 reads biometric information on a user using each of the sensors 311 and 321, and converts the biometric information into a feature vector indicating a feature of the biometric information. Next, each of the terminal devices 310 and 320 encrypts elements in the feature vector to homomorphic ciphertexts. Each of the terminal devices 310 and 320 then transmits a homomorphic encryption vector including the homomorphic ciphertexts as the elements, to the calculation server 200. Encryption data based on the biometric information is transmitted when the template is registered and when the collation as to whether the user is the authentic person or not is made. Each of the terminal devices 310 and 320 transmits the encryption data based on the biometric information to the calculation server 200 to receive the authentication that the user is the authentic person who has registered the template. Each of the terminal devices 310 and 320 that have received the authentication transmits an execution request of data processing to the calculation server 200, and receives the provision of a data processing service.

The calculation server 200 is a computer that manages a feature vector being encrypted in accordance with biometric information on a user, and executes processing in accordance with a processing request from the terminal device 310 or 320 that the user uses. The calculation server 200 cooperates with the authentication server 100, performs authentic person identification based on biometric information on a user that uses the terminal device 310 or 320, and accepts a processing request from only the terminal device that the user who is identified as the authentic person uses. For example, the calculation server 200 holds a ciphertext of a template registration-use feature vector that is provided from the terminal device 310, as a template. Further, at the authentication, the calculation server 200 calculates a distance between a feature vector having been used for the generation of a template and a feature vector having been provided for the collation while the feature vectors remain encrypted. Further, the calculation server 200 selects a plurality of encrypted elements in the collation-use feature vector in a random manner.

The authentication server 100 holds a secret key corresponding to each user, and is a computer that decrypts a homomorphic ciphertext with the secret key to determine a success or a failure of the biometric authentication. For example, the authentication server 100 executes an authentication service in response to an authentication request from the calculation server 200. For example, the authentication server 100 decrypts the encrypted element received from the calculation server 200 using the secret key. Next, the authentication server 100 checks whether the decryption result is "0" or "1", and if "0" or "1", decrypts a distance (concealment distance) being encrypted. The authentication server 100 determines the authentication success if the distance is less than the threshold value, whereas determines the authentication failure if the distance is greater than or equal to the threshold value. On the other hand, if the decryption result of the encrypted element is a value other than "0" and "1", the authentication server 100 determines that an attack is performed, and determines the authentication failure.

Figure 3:
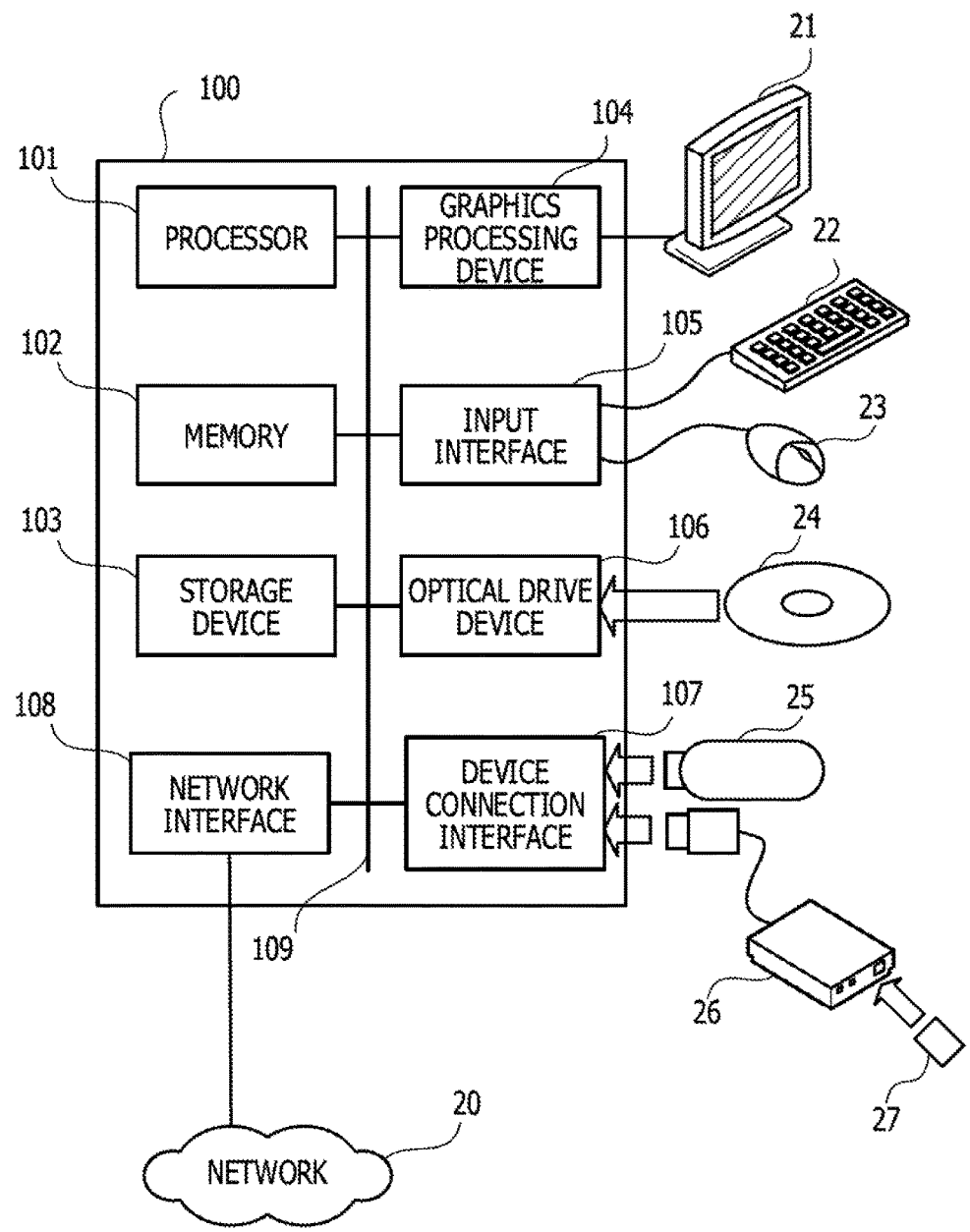
FIG. 3 illustrates one configuration example of hardware of an authentication server.

Such a system provides a data processing service after performing the authentic person identification based on the biometric authentication. FIG. 3 is a diagram illustrating one configuration example of hardware of an authentication server. A processor 101 totally controls the authentication server 100. A memory 102 and multiple peripheral devices are coupled to the processor 101 via a bus 109. The processor 101 may also be a multi-processor. The processor 101 is, for example, a central processing unit (CPU), a micro processing unit (MPU), or a digital signal processor (DSP). An electronic circuit such as an application specific integrated circuit (ASIC), and a programmable logic device (PLD) may implement at least a part of the functions that are implemented by the execution of a program by the processor 101.

The memory 102 is used as a main storage of the authentication server 100. The memory 102 temporarily stores therein at least a part of programs of an operating system (OS) that the processor 101 is caused to execute or application programs. Moreover, the memory 102 stores therein various kinds of data that is used for the processing by the processor 101. As for the memory 102, for example, a volatile semiconductor memory device such as a random access memory (RAM) is used.

Examples of the peripheral devices coupled to the bus 109 include a storage device 103, a graphics processing device 104, an input interface 105, an optical drive device 106, a device connection interface 107, and a network interface 108.

The storage device 103 electrically or magnetically writes and reads data with respect to an integral storage medium.

The storage device 103 is used as an auxiliary storage memory of the computer. The storage device 103 stores therein programs of the OS, application programs, and various kinds of data. Further, for example, a hard disk drive (HDD) or a solid state drive (SSD) may be used as the storage device 103.

A monitor 21 is coupled to the graphics processing device 104. The graphics processing device 104 causes an image to be displayed on a screen of the monitor 21 in accordance with an instruction from the processor 101. Examples of the monitor 21 include a display device that uses a cathode ray tube (CRT) or a liquid crystal display device.

A keyboard 22 and a mouse 23 are coupled to the input interface 105. The input interface 105 transmits signals sent from the keyboard 22 or the mouse 23 to the processor 101. Further, the mouse 23 is one example of pointing devices, and other pointing devices may be used. Example of other pointing devices includes a touch panel, a tablet, a touch pad, and a trackball.

The optical drive device 106 reads data recoded on an optical disk 24 utilizing laser light and the like. The optical disk 24 is a transportable recording medium in which data is record so as to be readable with the reflection of light. Examples of the optical disk 24 include a digital versatile disc (DVD), a DVD-RAM, a compact disc read only memory (CD-ROM), and a compact disc recordable (CD-R)/compact disc rewritable (CD-RW).

The device connection interface 107 is an interface that couples the peripheral devices to the authentication server 100. For example, a memory device 25 and a memory reader/writer 26 are coupled to the device connection interface 107. The memory device 25 is a recording medium having a function of communicating with the device connection interface 107. The memory reader/writer 26 is a device that writes data to a memory card 27, or reads data from the memory card 27. The memory card 27 is a card-type recording medium.

The network interface 108 is coupled to the network 20. The network interface 108 transmits/receives to and from another computer or another communication device, via the network 20.

The hardware configuration in the foregoing implements the processing function of the authentication server 100 in the second embodiment. The calculation server 200, and the terminal devices 310 and 320 are also implemented with the hardware configuration similar to that in the authentication server 100. Moreover, the device indicated in the first embodiment is also implemented with the hardware configuration similar to that in the authentication server 100 illustrated in FIG. 3.

The authentication server 100 executes a program recorded on a computer readable recording medium, for example, thereby implementing the processing function in the second embodiment. The program in which the processing contents that the authentication server 100 is caused to execute are described may be recorded on various recording media. For example, a program that the authentication server 100 is caused to execute may be stored in the storage device 103. The processor 101 loads at least a part of the program in the storage device 103 into the memory 102, and executes the program. Further, a program that the authentication server 100 is caused to execute may be recorded on a transportable recording medium such as the optical disk 24, the memory device 25, and the memory card 27. The program stored in the transportable recording medium is executable after being installed in the storage device 103 under the control from the processor 101, for example.

Further, the processor 101 may directly read the program from the transportable recording medium and execute it.

The function of the calculation server 200 in the second embodiment is implemented based on a program, similar to that of the authentication server 100. In the second embodiment, biometric authentication is performed using homomorphic encryption. With the use of the homomorphic encryption, a feature vector corresponding to biometric information on each user is held as encryption data, and a calculation of distance between two feature vectors is conducted without the feature vectors being decrypted. Hereinafter, a homomorphic encryption technique that is applied to the second embodiment will be described in details.

As a structural method of the somewhat homomorphic encryption, for example, may be used the scheme disclosed "Evaluating 2-DNF Formulas on Ciphertexts". Hereinafter, the scheme disclosed in "Evaluating 2-DNF Formulas on Ciphertexts" is called a BGN scheme from the names of the proponents.

As preliminaries for explanation of the BGN scheme, symbols are defined. Hereinafter, a set of natural numbers is set as N, and a set of integers is set as Z. When $n=p \times q \in N$ is defined with respect to prime numbers $p, q \in N$, an additive group generated by the remainder when the integer is divided by n is written as Z/nZ, and a reduced residue class group is written as (Z/nZ)×. Moreover, groups $G, G_T$ are multiplicative cyclic groups of an order n, $g \in G$ is a generator of the group G. A function that calculates a discrete logarithmic value using base x with respect to elements x, y in the group G or $G_T$ is represented as DL (x, y). Map $e: G \times G \rightarrow G_T$ satisfies a nondegenerate bilinear map. In other words, with respect to (i) arbitrary $a, b \in Z$, $e(g^a, g^b)=e(g, g)^{ab}$, and (ii) $e(g, g) \neq 1_{GT}$ and $G_T = <e(g, g)>$ are satisfied. Note that, $1_{GT}$ is set as an identity element in $G_T$. In this case, with respect to an arbitrary element $g_p$ in a subgroup of the order p in the group G and an arbitrary element $g_q$ in a subgroup of the order q, $e(g_p, g_q)=1_{GT}$ is obtained. Moreover, the extraction of an element a from a set A in accordance with a certain probability distribution is written as $a \leftarrow A$, specially, the extraction in accordance with a uniform distribution is written as $a \leftarrow^u A$, and the substitution of a value y into a variable x is written as $x \leftarrow y$.

The BGN scheme is configured by three algorithms of a key generation algorithm ($Gen_{BGN}$), an encryption algorithm ($Enc_{BGN}$), and a decryption algorithm ($Dec_{BGN}$).

<Key Generation Algorithm $Gen_{BGN}$>
Input: security parameter $\lambda \in N$
Output: public key (n, G, $G_T$, g, h, e), secret key (p, q)
1. Generate prime numbers p, q of λ bit, $n \leftarrow p \times q$
2. $g \leftarrow^u G$, $h' \leftarrow^u G$, $h \leftarrow (h')^q$
<Encryption Algorithm $Enc_{BGN}$>
Input: plain text $m \in \{0, 1, \ldots, S\}$ (S<q), random number $r \in Z/nZ$, public key (n, G, $G_T$, g, h, e)
Output: ciphertext $c=g^m h^r \in G$
<Decryption Algorithm $Dec_{BGN}$>
Input: ciphertext c, secret key (p, q)
Output: plain text $m=DL (g^p, c^p)$ Here, DL (A, B) is a function that solves a discrete logarithm problem of B using base A. In the decryption algorithm, a discrete logarithm problem in a group G has to be solved. The amount of calculation of O ($S^{1/2}$) used in a square root method, that is the best solution, so that a parameter S has to be set so as to allow this calculation.

Here, it is indicated that addition (encryption addition) and multiplication (encryption multiplication) are possible while data remains encrypted in the BGN scheme.

Firstly, it is indicated that the encryption addition holds true. Two plain texts m1, $m2 \in Z$ are set. When these plain texts are added and encrypted, the following expression is obtained. Here, the encryption is written as E in a simplified manner.

$$E(m1+m2)=g^{m1+m2}h^r$$

Meanwhile, the encryption addition is implemented by executing a computation on the group G. When the two plain texts are respectively encrypted and computed, the following expression is obtained. Note that, a symbol of the encryption addition is written as "+" surrounded by a circle.

$$E(m1) \oplus E(m2)=(g^{m1}h^{r1}) \times (g^{m2}h^{r2})=g^{m1+m2}h^{r1+r2} \quad (1)$$

Here, when the expression (1) is decrypted, m1+m2 is obtained, and the following expression is satisfied, so that the encryption addition holds true.

$$E(m1+m2)=E(m1) \oplus E(m2) \quad (2)$$

Next, it is indicated that the encryption multiplication holds true. The encryption multiplication is implemented by utilizing a bilinear map. When the encryption multiplication is set as *, g1=e(g, g), h1=e(g, h)$\in G_T$, and ciphertexts E(m1), E(m2) with respect to two plain texts m1, $m2 \in Z$ are computed by a bilinear map, the following expression is obtained.

$$E(m1)*E(m2)=e(E(m1),E(m2))= e(g^{m1}h^{r1}, g^{m2}h^{r2})=g1^{m1 \cdot m2} \cdot h1^{m1 r2+r1 m2+r1 r2}$$

Here, when DL ($g1^p$, E(m1)*E(m2)) is calculated as the decryption, the product of plain texts m1m2 is obtained, and the following expression is satisfied, so that the encryption multiplication holds true.

$$E(m1 m2)=E(m1)*E(m2)$$

In this manner, with the homomorphic encryption that allows the encryption addition and the encryption multiplication, a feature vector indicating a feature of biometric information is encrypted, at the collation, an Euclidean squared distance is calculated while data remains as encryption data.

As a comparative example, a biometric authentication method using the homomorphic encryption in a case where no specific measure against an attack such as spoofing is employed will be described herein.

Figure 4:
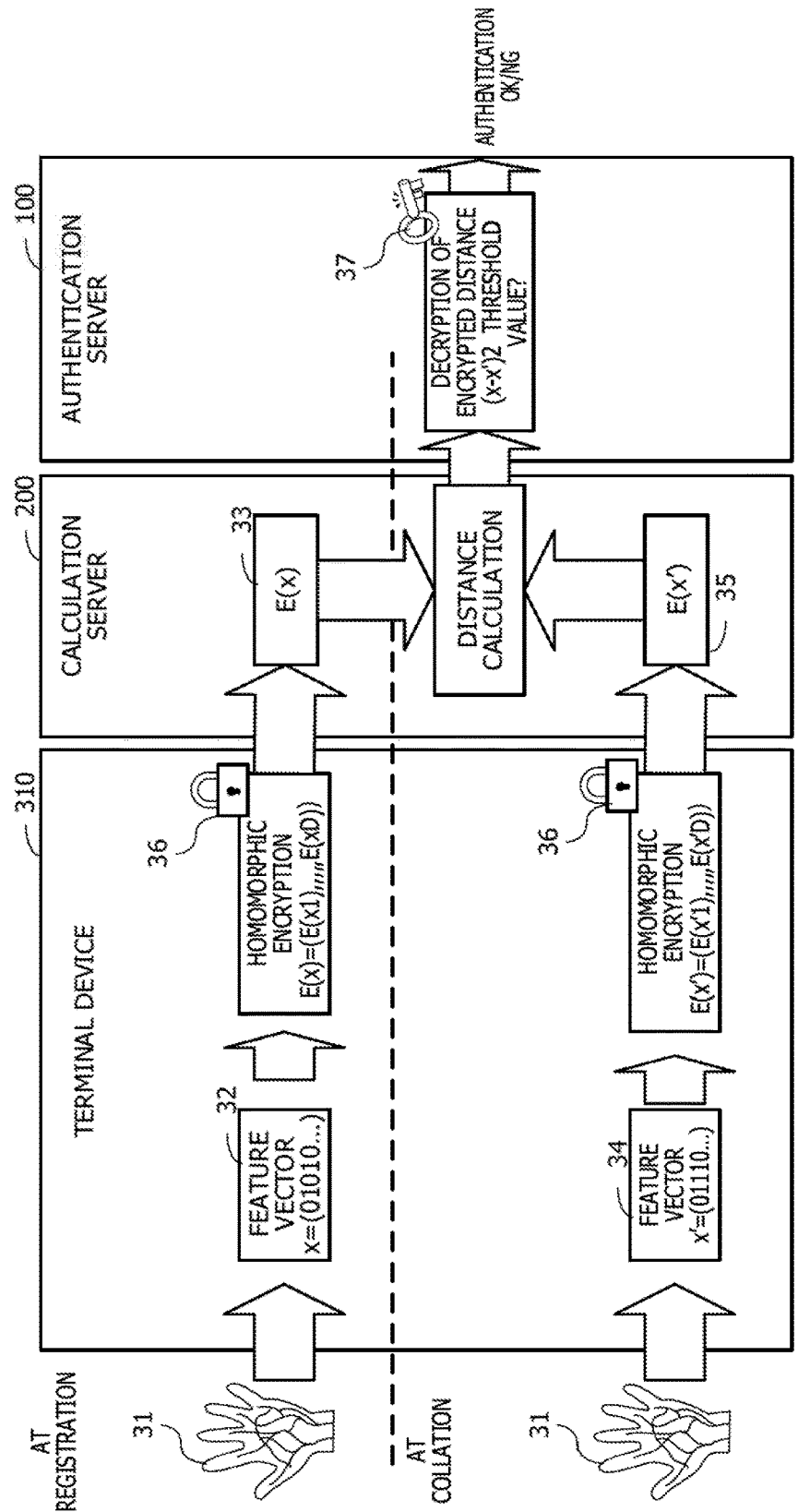
FIG. 4 illustrates one example of biometric authentication using homomorphic encryption.

FIG. 4 is a diagram illustrating one example of biometric authentication using the homomorphic encryption. To conduct biometric authentication, a template 33 based on biometric information is firstly registered to the calculation server 200. When a vein pattern in a palm is used as the biometric information, a user holds a palm 31 of the user over the sensor 311, and causes the terminal device 310 to read a vein pattern in the palm 31. The terminal device 310 generates a feature vector 32 based on the read vein pattern. The feature vector 32 has elements each of which has a value of either "0" or "1", such as "x=(01010 . . . )". The terminal device 310 encrypts the generated feature vector 32 using a public key 36 to a homomorphic encryption vector E(x).

The encryption is performed for each element in the feature vector 32. Accordingly, when the number of elements is set as D (D is an integer of 1 or more), and values of the elements in the feature vector 32 are set as "$x_1, x_2, \ldots, x_D$", the homomorphic encryption vector E(x) is expressed as "E(x)=(E($x_1$), E($x_2$), . . . , E($x_D$))". The homomorphic encryption vector E(x) obtained by the encryption is sent to the calculation server 200, and is held by being associated with an ID of the user, for example, as the template 33.

Also at the collation, a vein pattern in the palm 31 of a user is read, and a feature vector 34 is generated in the terminal device 310. Further, the feature vector 34 that is generated at the collation is not the same as the feature vector 32 that is generated at the registration due to an influence by different positions of the palm 31 when being read, and is, for example "x'=(01110 . . . )". The terminal device 310 performs the homomorphic encryption on the feature vector 34, using the public key 36, for each element to generate a homomorphic encryption vector "E(x')=(E(x'$_1$), E(x'$_2$), . . . , E(x'$_D$))". The generated homomorphic encryption vector E(x') is transmitted to the calculation server 200, as a sample 35.

The calculation server 200 calculates an Euclidean squared distance between the template 33 and the sample 35 while remaining encrypted, and transmits the calculation result to the authentication server 100. The authentication server 100 decrypts the distance in an encrypted state (encrypted distance) using a secret key 37 to obtain an Euclidean squared distance $\Sigma(xi-yi)^2$ of a plain text. The authentication server 100 then compares the distance with a threshold value, and determines the authentication success if the distance is less than the threshold value. On the other hand, the authentication server 100 determines the authentication failure if the distance exceeds the threshold value.

In the biometric authentication using the homomorphic encryption as illustrated in FIG. 4, the use of the binary code as the feature vector results in allowing spoofing by data called wolf. In the biometric authentication, an error to some extent between a template and a sample is allowable by setting a threshold value to a large value to some extent. In the biometric authentication system, a vector (wolf) the Euclidean squared distance of which with an arbitrary feature vector is less than the threshold value is present, and the use of the vector (wolf) allows the feature vector to be restored.

Hereinafter, details of a spoofing attack by a wolf with respect to the biometric authentication system, and a feature vector acquisition attack using the wolf will be described.

The spoofing attack by the wolf holds true if the following conditions are satisfied.
1. An attacker has already acquired a public key of a spoofing target user.
2. The attacker is capable of transmitting an authentication request in which a designated vector is used.
3. A feature vector uses a binary code.
4. A threshold value is already known, and when the number of dimensions of the feature vector is D, the threshold value is greater than D/4.
5. The number of dimensions D is divisible by 4.
6. A success or a failure of the authentication is determined by comparing the Euclidean squared distance between the vectors with the threshold value.

As for the conditions 3 and 4, encoding methods that represent biometric information such as irises or a palm print as a binary code are generally utilized, and the error rate of 0.3 to 0.4 is reported even when the threshold value is set to a value greater than D/4. Accordingly, the conditions 3 and 4 are practical conditions.

The spoofing attack by the wolf uses a vector, as a feature vector, that is unexpected in the authentication system. For example, the masquerade is possible by using a vector (½, . . . , ½) in which the value of each of all the elements is ½ as a feature vector, encrypting the feature vector in a normal procedure, and thereafter performing an authentication request to the calculation server 200.

Figure 5:
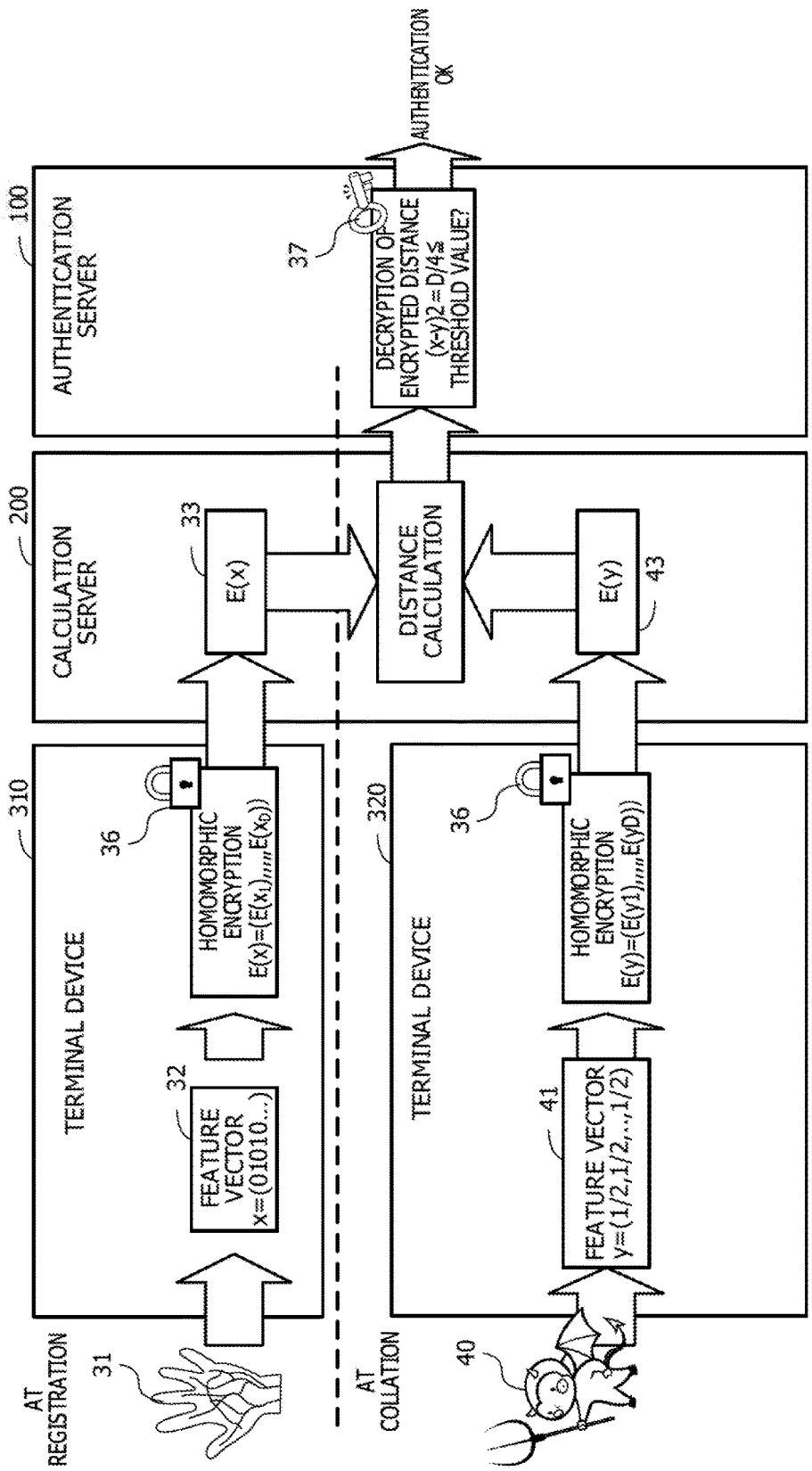
FIG. 5 illustrates one example of a spoofing attack.

FIG. 5 is a diagram illustrating one example of the spoofing attack. FIG. 5 illustrates an example of a case where an attacker 40 who uses the terminal device 320 spoofs as a user who uses the terminal device 310. The attacker 40 who uses the terminal device 320 sets a feature vector 41 having a predetermined value, instead of a vein pattern in a palm of the attacker 40, to the terminal device 320. The feature vector 41 is, for example, a vector in which the value of each of all the elements is "½". The respective elements in the feature vector 41 are encrypted to homomorphic ciphertexts to generate a homomorphic encryption vector "E(y)=(E(y$_1$), E(y$_2$), . . . , E(y$_D$))". Further, the homomorphic encryption vector E(y) is transmitted to the calculation server 200, as a collation-use sample 43 for the user who uses the terminal device 310.

In the calculation server 200, a distance (encrypted distance) between the authentication-use template 33 of the user who uses the terminal device 310 and the sample 43 that is inputted for the purpose of the spoofing is calculated while remaining encrypted. Further, the authentication server 100 decrypts the encrypted distance to calculate a distance of a plain text.

Note that, the value of each element of "½" in the spoofing-use feature vector 41 indicates an inverse element of 2 on the group Z/nZ. In a case of a∈{0, 1}, if a is "0" or "1", a square of the difference between a and ½ (a-½)² is ¼. When the number of elements is D, an Euclidean squared distance between the feature vector 32 and the feature vector 41 is D/4. If a threshold value is greater than D/4, the Euclidean squared distance is less than the threshold value, thus, the spoofing is succeeded. Further, if the system expects a binary vector, the element on the group Z/nZ is a plain text, so that the encryption is executed on a value other than 0 and 1 in a normal procedure, by the homomorphic encryption method.

Such vector (wolf) that allows the spoofing by another person is present to allow an attack in which the original feature vector is acquired from the encrypted feature vector, using the vector, without using a secret key.

Next, a feature vector acquisition attack using wolf will be described. This attack uses such a mechanism that using the distance being D/4 when the aforementioned wolf is used, an authentication result is changed depending on whether the value of an element in an attack target is "0" or "1".

Figure 6:
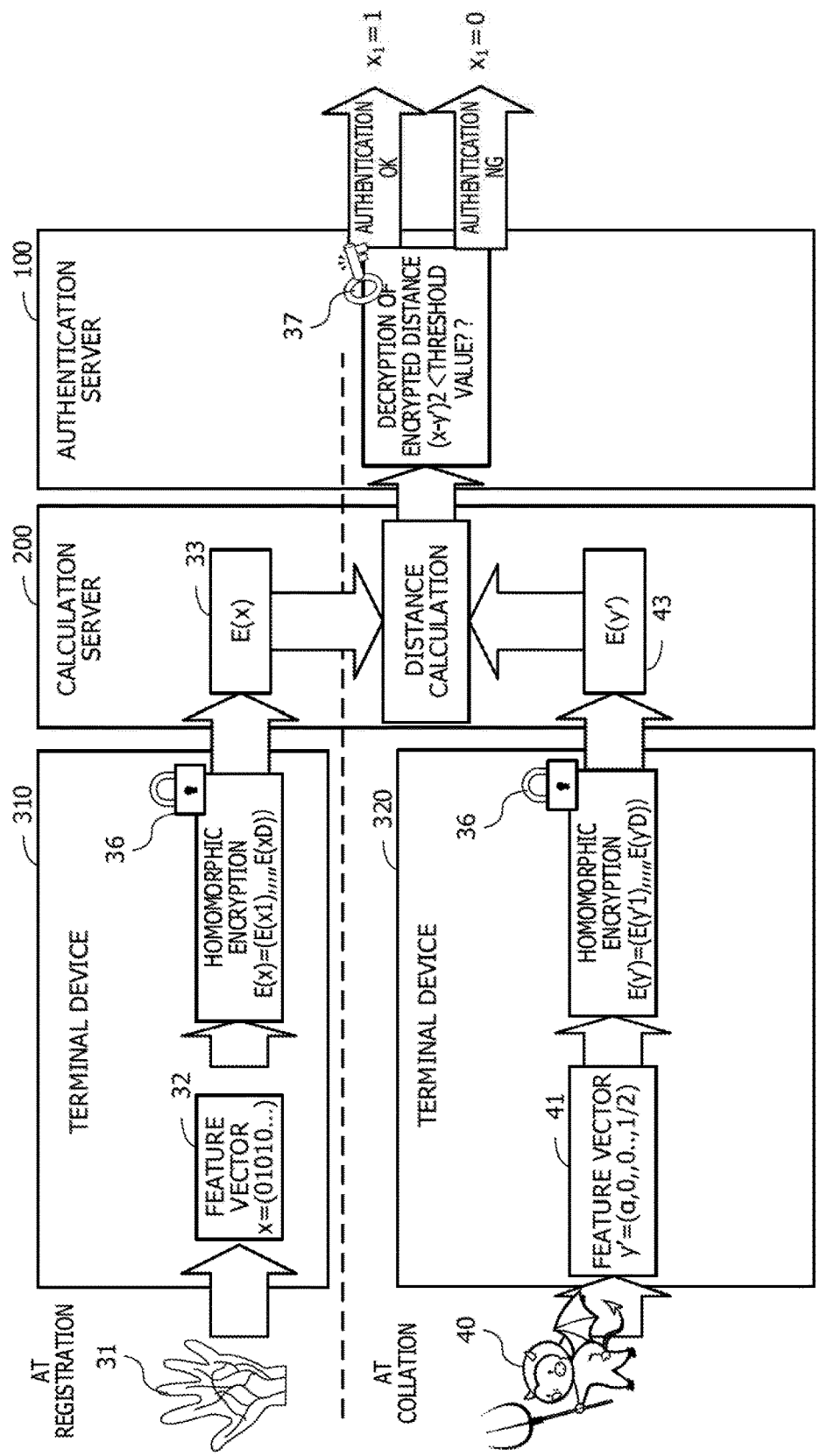
FIG. 6 illustrates one example of a feature vector restoration attack.

FIG. 6 is a diagram illustrating one example of a feature vector acquisition attack. Herein, as an example, in a case of the number of dimensions D=2048 and a threshold value θ=800, an acquisition method of a first element in a registration-use feature vector of an attack target user is illustrated.

In this case, an attacker generates a vector as the following expression.

$$y'=(a,0,0,0,½,½, . . . ,½)$$

α=17 is set to an element corresponding to the element to be acquired, "0" is set to next three elements, and "½" is set to the other elements. When authentication processing is performed using the vector, "authentication failure" occurs if an attack target element is $x_0$=0, whereas "authentication success" occurs if $x_0$=1. In other words, whether the authentication is succeeded or not turns out the value of the attack target element $x_0$.

Further, the determination result of authentication only depends on the value of the attack target element $x_0$ in the feature vector 32, but is not affected by the values of $x_2$, $x_3$, and $x_4$. Hereinafter, an Euclidean squared distance depending on the values of four elements from the head in the feature vector 32 when a feature vector restoration attack is received is indicated.

(1) Euclidean squared distance in a case of $x_0=0$

1. A case of $x_2+x_3+x_4=0$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=17^2+(2048-4)/4=800 \text{ (authentication failure)}$$

2. A case of $x_2+x_3+x_4=1$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=17^2+1+(2048-4)/4=801 \text{ (authentication failure)}$$

3. A case of $x_2+x_3+x_4=2$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=17^2+2+(2048-4)/4=802 \text{ (authentication failure)}$$

4. A case of $x_2+x_3+x_4=3$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=17^2+3+(2048-4)/4=803 \text{ (authentication failure)}$$

(2) Euclidean squared distance in a case of $x_0=1$

1. A case of $x_2+x_3+x_4=0$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=16^2+(2048-4)/4=767 \text{ (authentication success)}$$

2. A case of $x_2+x_3+x_4=1$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=16^2+1+(2048-4)/4=768 \text{ (authentication success)}$$

3. A case of $x_2+x_3+x_4=2$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=16^2+2+(2048-4)/4=769 \text{ (authentication success)}$$

4. A case of $x_2+x_3+x_4=3$ $$d=\Sigma(x_i-y'_i)^2=\Sigma\{(\alpha-0)^2+(x_2-0)^2+(x_3-0)^2+(x_4-0)^2+ (x_5-\frac{1}{2})^2+\ldots+(x_{2048}-\frac{1}{2})^2\}=16^2+3+(2048-4)/4=770 \text{ (authentication success)}$$

As in the forgoing, independent of the values of $x_2$, $x_3$, and $x_4$, "authentication failure" occurs if $x_0=0$, whereas "authentication success" occurs if $x_0=1$.

In this example, only $x_0$ is acquired, however, authentication requests are performed by changing the position to which a is set in sequence to allow all the elements in the feature vector 32 having been used at the registration to be restored, from the obtained authentication results.

The example of $\alpha=17$ is indicated herein. Meanwhile, $\alpha$ is generally a value that satisfies the following condition including the threshold value $\theta$ and the number of dimensions D.

$$(\theta-(D-4)/4)^{1/2}\leq\alpha<(\theta-(D-4)/4)^{1/2}+1$$

In the second embodiment, by utilizing the use of a feature vector in which a value other than "0" and "1" is set to an element by such spoofing or feature vector acquisition attack, a part of elements in a sample is decrypted, and whether a value is "0" or "1" is checked. If at least one element has a value of "0" or "1", an invalid attack is determined.

Figure 7:
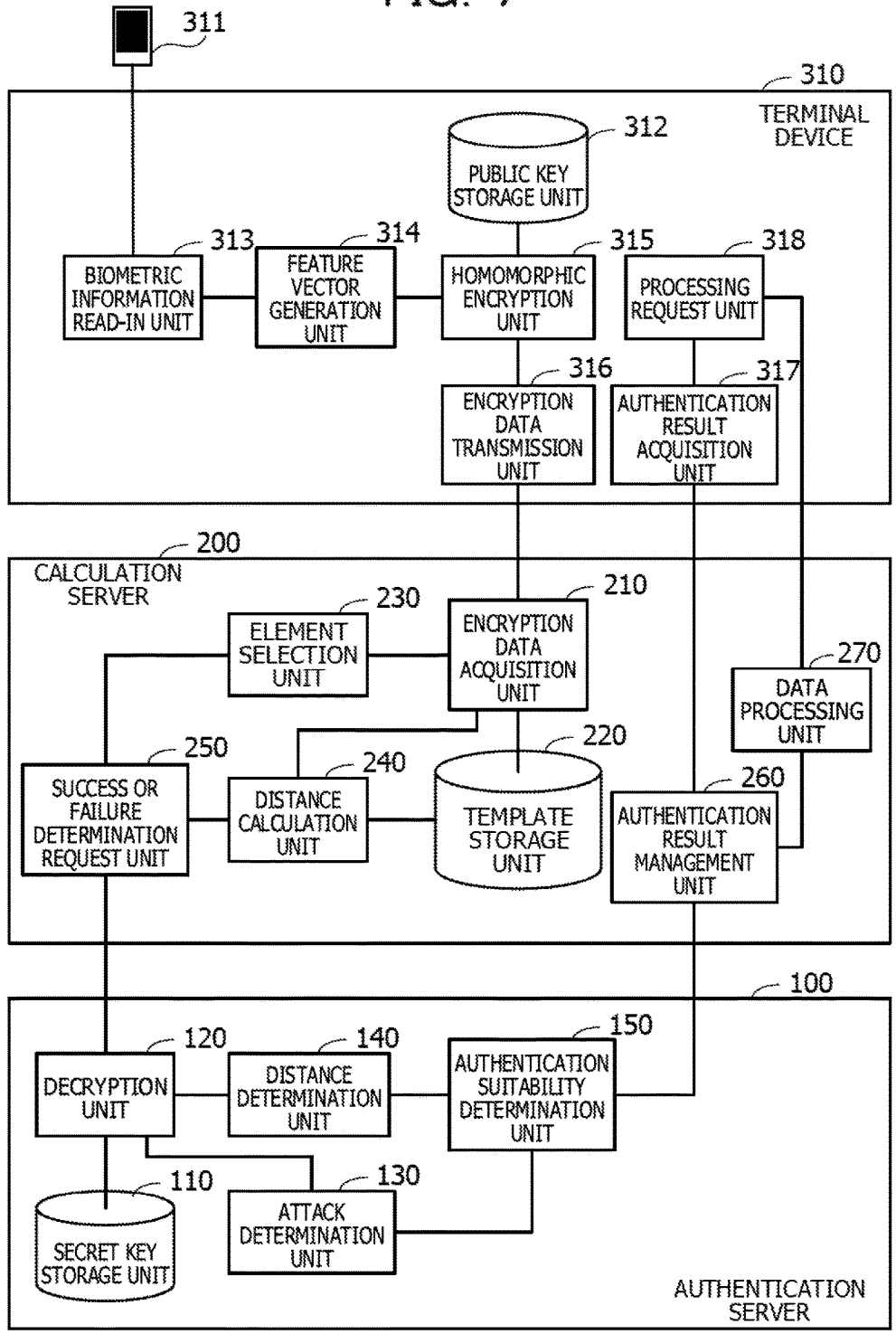
FIG. 7 illustrates functions included in respective devices.

Hereinafter, a function of an authentication system including a detection function against an attack will be described. FIG. 7 is a block diagram illustrating functions included in the respective devices. The terminal device 310 includes a public key storage unit 312, a biometric information read-in unit 313, a feature vector generation unit 314, a homomorphic encryption unit 315, an encryption data transmission unit 316, an authentication result acquisition unit 317, and a processing request unit 318.

The public key storage unit 312 stores therein a public key that is generated for a user of the terminal device 310. The biometric information read-in unit 313 reads biometric information via the sensor 311. For example, the biometric information read-in unit 313 reads an image on which a vein pattern in a palm is projected.

The feature vector generation unit 314 converts a feature of the biometric information into a feature vector. The value of each element in the feature vector is a binary code. The homomorphic encryption unit 315 encrypts the feature vector using the public key stored in the public key storage unit 312. At this time, the homomorphic encryption unit 315 performs the encryption for each of the elements in the feature vector.

The encryption data transmission unit 316 transmits a request including a homomorphic encryption vector based on the feature vector, to the calculation server 200. At the registration of a template, the encryption data transmission unit 316 transmits, for example, a template registration request including a user ID and a homomorphic encryption vector of a user who uses the terminal device 310, to the calculation server 200. Further, at the collation of a sample, the encryption data transmission unit 316 transmits, for example, an authentication request including a user ID and a homomorphic encryption vector of a user who uses the terminal device 310, to the calculation server 200.

The authentication result acquisition unit 317 receives an authentication result from the calculation server 200. If the authentication is succeeded, the authentication result acquisition unit 317 notifies the processing request unit 318 of the success of the authentication. When the authentication is succeeded, the processing request unit 318 transmits a data processing request to the calculation server 200, in response to an input from the user.

The calculation server 200 includes an encryption data acquisition unit 210, a template storage unit 220, an element selection unit 230, a distance calculation unit 240, a success or failure determination request unit 250, an authentication result management unit 260, and a data processing unit 270.

The encryption data acquisition unit 210 acquires a request including a homomorphic encryption vector, from the terminal device 310. For example, when the encryption data acquisition unit 210 receives a template registration request of a user, the encryption data acquisition unit 210 stores the homomorphic encryption vector included in the registration request, in the template storage unit 220, as a template, in such a manner that the homomorphic encryption vector is in association with a user ID of the user. Further, when the encryption data acquisition unit 210 receives an authentication request, the encryption data acquisition unit 210 transmits a homomorphic encryption vector included in the authentication request, to the element selection unit 230 and the distance calculation unit 240.

The element selection unit 230 selects elements of a predetermined number from the homomorphic encryption vector that is received from the encryption data acquisition unit 210. For example, the element selection unit 230 selects four elements. The element selection unit 230 transmits the elements having been selected (selected elements), to the success or failure determination request unit 250.

The distance calculation unit 240 uses the homomorphic encryption vector that is received from the encryption data acquisition unit 210 as a sample, and calculates an Euclidean squared distance (encrypted distance) being encrypted between the template that is stored in the template storage unit 220 and the sample. The distance calculation unit 240 transmits the calculated encrypted distance to the success or failure determination request unit 250.

The success or failure determination request unit 250 transmits a success or failure determination request including the multiple selected elements that are received from the element selection unit 230 and the encrypted distance that is received from the distance calculation unit 240, to the authentication server 100. The success or failure determination request includes, for example, the user ID of the user who uses the terminal device 310 having transmitted the authentication request.

The authentication server 100 includes a secret key storage unit 110, a decryption unit 120, an attack determination unit 130, a distance determination unit 140, and an authentication suitability determination unit 150. The secret key storage unit 110 stores therein a secret key for each user.

The decryption unit 120 decrypts an encrypted distance and multiple selected elements that are included in a success or failure determination request that is sent from the calculation server 200, using the secret key stored in the secret key storage unit 110. The decryption unit 120 transmits a value of a distance obtained by the decryption of the encrypted distance, to the distance determination unit 140. Further, the decryption unit 120 transmits values of elements obtained by the decryption of the selected elements, to the attack determination unit 130.

The attack determination unit 130 determines whether the authentication request that is transmitted from the terminal device 310 is aimed at attacking, based on the values of the decrypted elements. For example, if at least one element has a value other than "0" and "1", out of the multiple elements, the attack determination unit 130 determines that the authentication request is aimed at attacking. The attack determination unit 130 transmits a determination result to the authentication suitability determination unit 150.

The distance determination unit 140 compares a value of the decrypted distance with a threshold value set in advance, and determines whether the value of the distance is less than the threshold value. The distance determination unit 140 transmits a determination result of the distance, to the authentication suitability determination unit 150.

The authentication suitability determination unit 150 determines the authentication success if the value of the distance is less than the threshold value, and the authentication request is not aimed at attacking. In contrast, the authentication suitability determination unit 150 determines the authentication failure if the value of the distance is greater than or equal to the threshold value, or the authentication is aimed at attacking. The authentication suitability determination unit 150 transmits a determination result of the authentication suitability, to the calculation server 200.

Note that, lines illustrated in FIG. 7 that couple the elements to one to another indicate a part of communication paths, communication paths other than the illustrated communication paths may be set. Moreover, the functions of the respective elements illustrated in FIG. 7 are implemented by causing a computer to execute a program module corresponding to each element, for example.

The authentication server 100 and the calculation server 200 include the functions as illustrated in FIG. 7 to suppress the authentication on an attack from a malicious user (the attacker 40).

Figure 8:
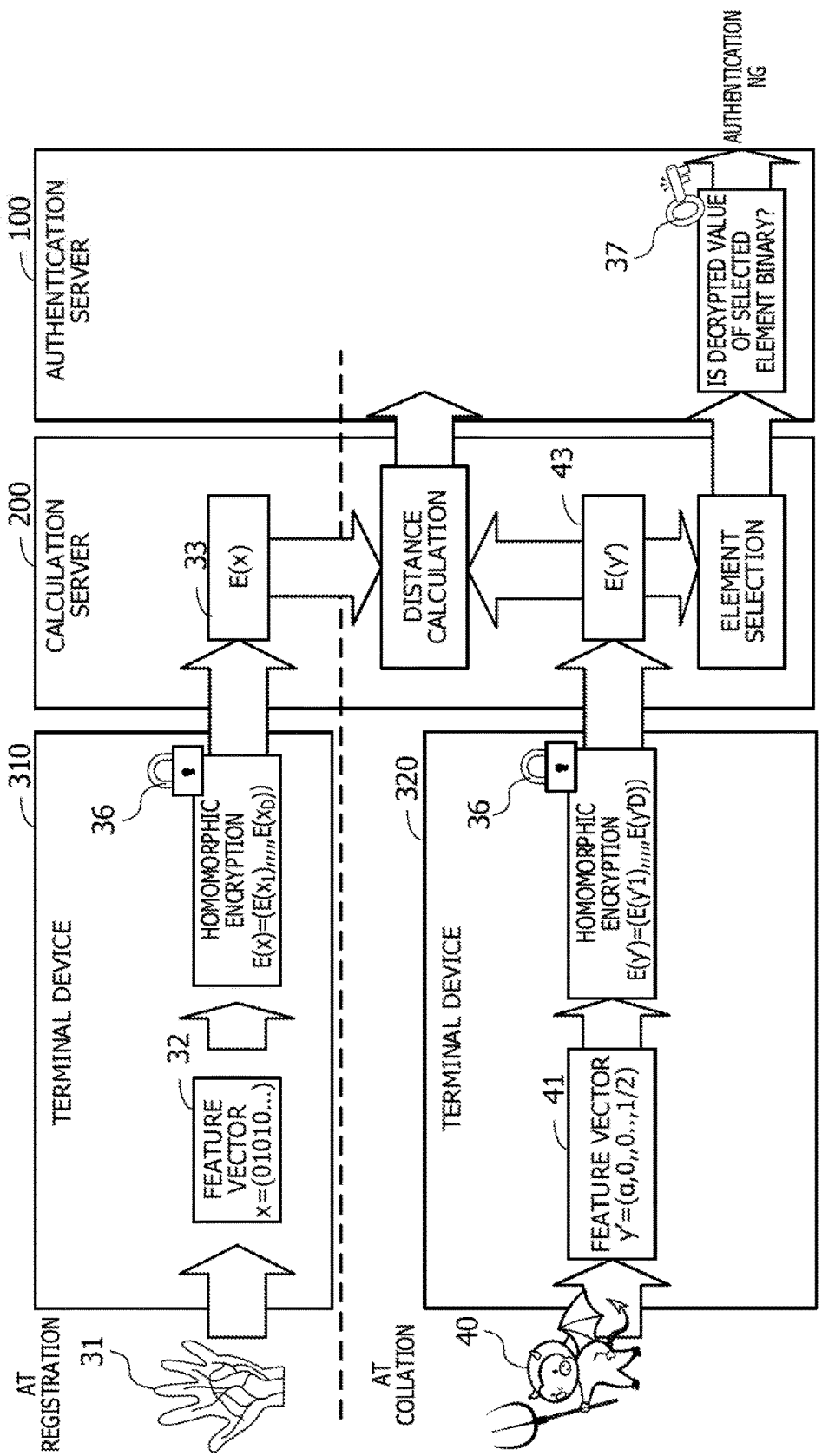
FIG. 8 illustrates one example of authentication processing to an authentication request aiming at restoring a feature vector.

FIG. 8 is a diagram illustrating one example of authentication processing to an authentication request that is aimed at restoring a feature vector. It is assumed that the attacker 40 inputs the feature vector 41 that aims at restoring the feature vector 32 having been used for the generation of the template 33, into the terminal device 320. Three elements in the feature vector 41 each have a value of "0". One element therein has a value of "α", which is an integer greater than 1. The other elements therein each have a value of "½". In the terminal device 320, the feature vector 41 is encrypted to a homomorphic encryption vector E(y) using the public key 36. The homomorphic encryption vector E(y) is transmitted, together with an authentication request, to the calculation server 200.

The calculation server 200 holds the homomorphic encryption vector E(y), as the collation-use sample 43. Next, the calculation server 200 selects four elements from the sample 43. For example, the calculation server 200 selects four elements in a random manner, from the elements included in the sample 43. Further, the calculation server 200 calculates an encrypted distance between the sample 43 and the template 33. Further, the calculation server 200 transmits the encrypted distance and the selected elements having been selected, together with a success or failure determination request, to the authentication server 100.

In the authentication server 100, each of the four selected elements is firstly decrypted using the secret key 37. If at least one value other than a binary ("0" and "1") is present in the values obtained by the decryption, the authentication server 100 determines that an invalid attack is received, and determines that the authentication result is a failure.

In other words, when the inputted feature vector 41 aims at acquiring the feature vector 32, only three elements each have a value of "0" in the elements in the feature vector 41. Accordingly, out of the decrypted four elements, at least one element has a value other than a binary, and thus the authentication is failed. This repulses an attack of inputting the invalid feature vector 41.

Figure 9:
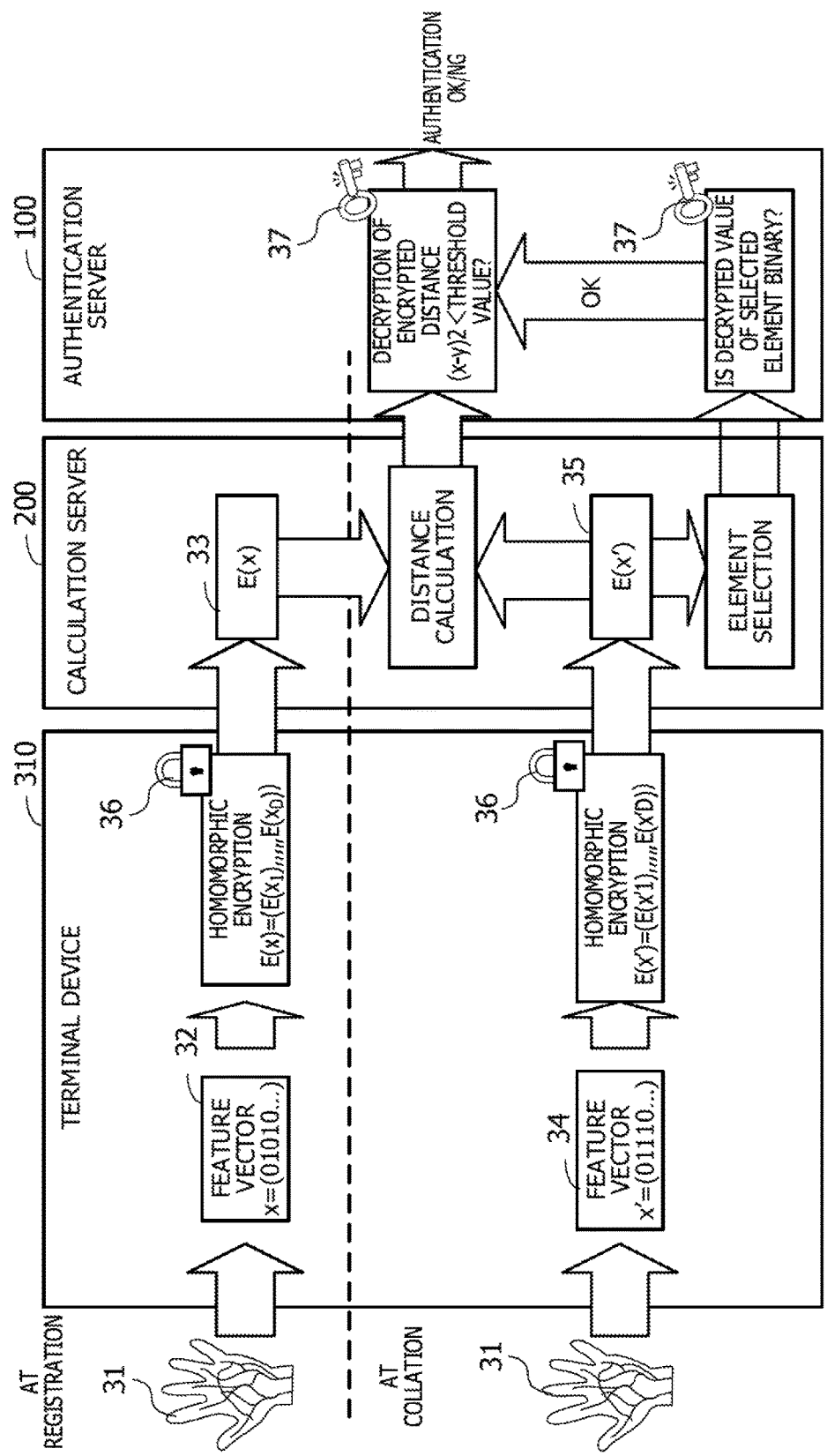
FIG. 9 illustrates normal authentication processing.

In contrast, if an authorized user inputs a feature vector based on biometric information of the authorized user, the feature vector is not determined as being invalid, and the authentication processing is continued. FIG. 9 is a diagram illustrating normal authentication processing. For example, when a user causes the terminal device 310 to read a vein pattern in the palm 31, the feature vector 34 indicating a feature of the vein pattern is generated in the terminal device 310. The value of each element in the feature vector 34 is a binary of "0" or "1". The feature vector 34 is encrypted to a homomorphic encryption vector E(x') using the public key 36. The homomorphic encryption vector E(x') is transmitted, together with an authentication request, to the calculation server 200. The calculation server 200 holds the homomorphic encryption vector E(x') as the sample 35. The calculation server 200 then calculates an encrypted distance between the sample 35 and the template 33, and selects four elements in the sample 35. The calculation server 200 then transmits the encrypted distance and the selected elements having been selected, together with a success or failure determination request, to the authentication server 100.

In the authentication server 100, each of the four selected elements is firstly decrypted using the secret key 37. Each of all the elements in the feature vector 34 has a value of "0" or "1", and the result of each decryption is also "0" or "1". Next, the authentication server 100 decrypts the encrypted distance to obtain a distance of a plain text. The authentication server 100 then compares the obtained distance with a threshold value. If the distance is less than the threshold value, the authentication server 100 determines that both of the template 33 and the sample 35 are generated from the vein pattern of the same person, and determines the authentication success. On the other hand, if the distance is greater than or equal to the threshold value, the authentication server 100 determines that the template 33 and the sample 35 are generated from vein patterns of different persons, and determines the authentication failure.

In this manner, the invalid action is removed, and the biometric authentication using the homomorphic encryption is conducted securely. Next, a processing procedure in the calculation server 200 and the authentication server 100 will be described in details.

Figure 10:
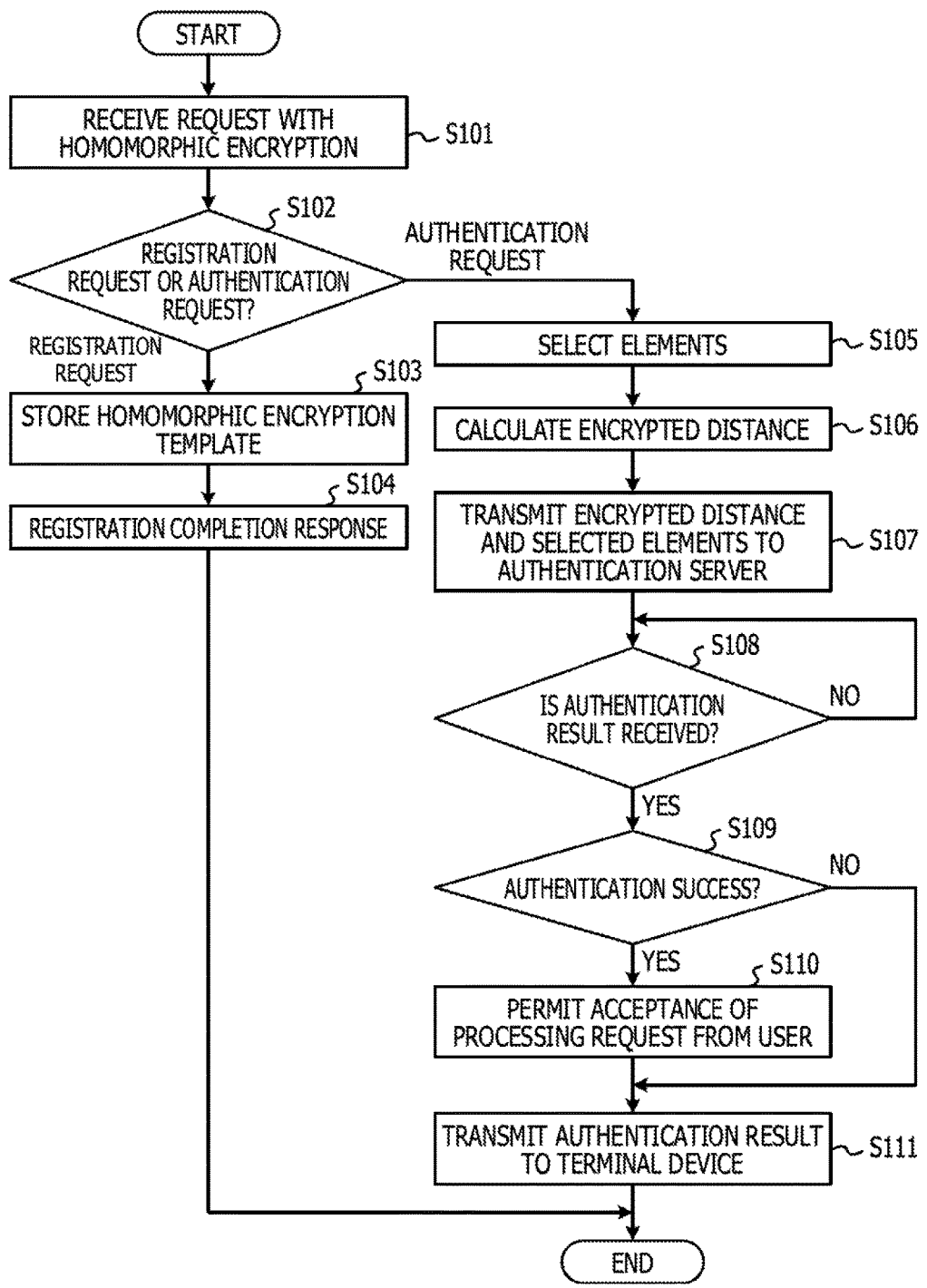
FIG. 10 is a flowchart illustrating one example of a procedure of the authentication processing in a calculation server.

FIG. 10 is a flowchart illustrating one example of a procedure of authentication processing in the calculation server. Hereinafter, the processing illustrated in FIG. 10 will be described in the order of step numbers.

[Step S101] The encryption data acquisition unit 210 acquires a request to which a homomorphic encryption vector is imparted from the terminal device 310, 320.

[Step S102] The encryption data acquisition unit 210 determines whether the acquired request is a registration request or an authentication request. If the registration request, the processing proceeds to Step S103. If the authentication request, the processing proceeds to Step S105.

[Step S103] The encryption data acquisition unit 210 stores the homomorphic encryption vector included in the registration request, as a template, in the template storage unit 220, by being in association with a user ID of a user who uses the terminal device as a transmission source of the registration request.

[Step S104] The encryption data acquisition unit 210 transmits a registration completion response to the terminal device that is the transmission source of the registration request. Thereafter, the processing ends.

[Step S105] The element selection unit 230 selects four elements from the homomorphic encryption vector included in the authentication request. The element selection unit 230 transmits the elements (selected elements) having been selected to the success or failure determination request unit 250.

[Step S106] The distance calculation unit 240 uses the homomorphic encryption vector included in the authentication request as a sample of a collation target, and calculates an encrypted distance with a template in the template storage unit 220. For example, the distance calculation unit 240 reads a template corresponding to a user ID indicated in the authentication request, from the template storage unit 220. The distance calculation unit 240 then performs a computation of obtaining a distance between the sample and the template while remaining encrypted to generate an encrypted distance. The distance calculation unit 240 transmits the generated encrypted distance to the success or failure determination request unit 250.

[Step S107] The success or failure determination request unit 250 transmits a success or failure determination request including the encrypted distance and the selected elements, to the authentication server 100.

[Step S108] The authentication result management unit 260 determines whether an authentication result is received from the authentication server 100. If the authentication result is received, the processing proceeds to Step S109. On the other hand, if the authentication result is not received, the processing at Step S108 is repeated.

[Step S109] The authentication result management unit 260 causes the processing to proceed to Step S110 if the received authentication result is a success. On the other hand, the authentication result management unit 260 causes the processing to proceed to Step S111 if the authentication result is a failure.

[Step S110] The authentication result management unit 260 permits the data processing unit 270 to accept a processing request from a user who has outputted the authentication request. After this, when the data processing unit 270 acquires a data processing request from the user, the data processing unit 270 executes data processing in accordance with the data processing request.

[Step S111] The authentication result management unit 260 transmits an authentication result, to the terminal device that is a transmission source of the authentication request. For example, when an authentication result indicating an authentication success is transmitted to the terminal device 310, the authentication result acquisition unit 317 of the terminal device 310 receives the authentication result, and notifies the processing request unit 318 of the authentication success. When the processing request unit 318 confirms that the authentication has been succeeded, the processing request unit 318 accepts an instruction of data processing from the user, and transmits a data processing request in accordance with the instruction, to the calculation server 200. In response to this, the data processing unit 270 of the calculation server 200 executes the data processing.

Next, a processing procedure in the authentication server 100 will be described in details. FIG. 11 is a flowchart illustrating one example of a processing procedure in the authentication server. Hereinafter, the processing illustrated in FIG. 11 will be described in the order of step numbers. Note that, in the following example, it is assumed that the number of selected elements having been selected is m (m is an integer of 1 or more). A selected element $E(z_i)$ (i=1, 2, . . . , m) is set. The value obtained by the decryption of the selected element $E(z_i)$ is $z_i$.

[Step S121] The decryption unit 120 sets "0" to a result flag r when the decryption unit 120 receives a success or failure determination request from the calculation server. The result flag is a flag indicating a success or a failure of an authentication result. If the authentication result is a success, "1" is set to the result flag r. If the authentication result is failure, the value of the result flag r remains "0".

[Step S122] The decryption unit 120 sets "1" to a variable i indicating the number of decryption times of the element.

[Step S123] The decryption unit 120 determines whether the value of the variable i is equal to or less than the number of selected elements m. If the value of the variable i is equal to or less than the number of elements m, the processing proceeds to Step S124. If the value of the variable i exceeds the number of elements m, the processing proceeds to Step S127.

[Step S124] The decryption unit 120 decrypts an i-th selected element. For example, the decryption unit 120 acquires a secret key from the secret key storage unit 110, and performs the decryption using the acquired secret key. The decryption unit 120 transmits a value $z_i$ obtained by the decryption, to the attack determination unit 130.

[Step S125] The attack determination unit 130 determines whether the value $z_i$ obtained by the decryption is a value of "1" or "0". If either one of "1" and "0", the processing proceeds to Step S126. If neither "1" nor "0", the processing proceeds to Step S130.

[Step S126] The decryption unit 120 increments the value of the variable i, and causes the processing to proceed to Step S123.

[Step S127] As a result of the decryption of all the selected elements, if each of all the values is "1" or "0", the decryption unit 120 decrypts the encrypted distance E(d).

The decryption unit 120 transmits a distance d obtained as a result of the decryption, to the distance determination unit 140.

[Step S128] The distance determination unit 140 determines whether the distance d is less than a threshold value θ. If the distance d is less than the threshold value θ, the processing proceeds to Step S129. If the distance d is greater than or equal to the threshold value θ, the processing proceeds to Step S130.

[Step S129] The authentication suitability determination unit 150 sets "1" to the result flag r.

[Step S130] The authentication suitability determination unit 150 determines whether the value of the result flag r is "1". If the value of the result flag r is "1", the processing proceeds to Step S131. If the value of the result flag r is "0", the processing proceeds to Step S132.

[Step S131] The authentication suitability determination unit 150 notifies the calculation server 200 of the authentication success, as an authentication result. Thereafter, the processing ends.

[Step S132] The authentication suitability determination unit 150 notifies the calculation server 200 of the authentication failure as an authentication result. Thereafter, the processing ends.

As in the forgoing, out of the elements encrypted to the homomorphic ciphertexts, four elements are decrypted, and are determined as to whether each value obtained by the decryption is a binary, thereby detecting and protecting an attack aiming at the acquisition of the feature vector that is a generation source of the template.

Note that, it may be also considered that a method of detecting an attack using a feature vector other than a binary, in the course of the calculation of the Euclidean squared distance. For example, the calculation expression "$d=\Sigma(x_i-y_i)^2$" of the Euclidean squared distance d is replaced with the following expression.

$$d'=\Sigma((x_i-y_i)^2+(\theta+1)\cdot y_i \cdot (y_i-1))$$

With this expression, a value $y_i$ of an element is a binary, a value of "$(\theta+1)\cdot y_i \cdot (y_i-1)$" is "0", whereas the value $y_i$ of the element is a value other than a binary", the value of "$(\theta+1)\cdot y_i \cdot (y_i-1)$" is a value other than "0", is added by $\Sigma$. As a result, a distance d' is greater than or equal to the threshold value θ, so that the authentication is failed.

Further, when such distance calculation is executed in a state of the homomorphic ciphertexts, the calculation such as the following is performed.

$$E(d)=e(g_k,h_k)^{t_2}\cdot e(h_k,h_k)^{-2}\cdot \Pi_{y,i}{}^D(e(c_{x,i},c_{x,i})\cdot e(c_{y,i},c_{y,i})\cdot e(c_{x,i},c_{y,i})^{-2}\cdot e(c_{y,i},c_{y,i})^{\theta+1}\cdot e(c_{y,i},g_k)^{-(\theta+1)}) \quad (3)$$

"e" in the expression (3), which is a calculation called pairing, has a significantly high calculation cost. "$g_k$, $h_k$" are public keys of a user k, "$c_{x,i}$" is an i-th element in an encrypted template. "$c_{y,i}$" is an i-th element in an encrypted sample. "$t_1$, $t_2$" are random number.

In the expression (3), the last term "$e(c_{y,i},g_k)^{-(\theta+1)}$" in $\Pi$ indicates a calculation that is increased for protecting against an attack. With the expression (3), the calculation of the pairing having significantly high cost is increased by the number of dimensions D, which results in a significant increase is cost of the calculation of encrypted distance.

In contrast, with the second embodiment, an increase in the processing in the calculation server 200 is only the selection of encrypted elements of a predetermined number and the transmission of the selected encrypted elements to the authentication server 100. As a result, an increase in a processing load in the calculation server 200 is suppressed.

Further, in the authentication server 100, although the processing of decrypting several encrypted elements is added, an increase in the calculation amount remains low, compared with the pairing calculation for the number of dimensions. As a result, an attack using a feature vector including a value other than a binary is efficiently protected.

Meanwhile, depending on a threshold value of distance, the use of a feature vector including four or more elements the value of each of which is "0" allows an invalid authentication to be accepted in some cases. The number of encrypted elements that are decrypted for the entire protection from spoofing is calculated as follows. For example, the calculation server 200 derives, based on the threshold value θ, the number of encrypted elements to be checked.

Here, when the number of dimensions of a feature vector is set as D, and a threshold value is set as θ, the number of elements that an attacker may insert 0 or 1 in the feature vector aiming at the spoofing is m (m is an integer of 1 or more, and equal to or less than D). In this case, m is derived as follows.

When ½ is set to (D−m) pieces of elements, and 0 or 1 is set to m pieces of elements, in the feature vector, a maximum value d of an Euclidean squared distance is as follows.

$$d=(D-m)/4+m$$

To success an attack, d less than the threshold value and (D−m) divisible by 4 are requested. From these conditions, m is as follows.

$$(D-m)/4+m<\theta \Rightarrow 3m<4\theta-D \Rightarrow m<(4\theta-D)/3$$

Accordingly, an attacker who performs spoofing attack uses a feature vector in which 0 or 1 is inserted into each of m pieces of elements, where m satisfies the above expression and (D−m) needs to be divisible by 4. Therefore, the authentication server 100 checks values of (m+1) pieces of elements to find one ciphertext having a value other than 0 and 1 from the attack-use feature vector to detect the attack.

Hereinafter, one example is indicated.

A case of D=2048, θ=600 (a case of D=4n)

In this case, (4θ−D)/3=117.3 is obtained. For the spoofing attack, due to the conditions that m is less than 117.3, and (D−m) is an integer divisible by 4, m=116 is obtained. In this case, a Euclidean squared distance is 599 at the maximum, and thus, making the success or failure determination on the authentication based on only the distance results in the spoofing success. In contrast, checking whether the value is "0" or "1" for 117 pieces of elements allows the detection of the spoofing.

A case of D=2049, θ=600 (a case of D=4n+1)

In this case, (4θ−D)/3=117 is obtained. For the spoofing attack, due to the conditions that m is less than 117, and (D−m) is an integer divisible by 4, m=113 is obtained. In this case, an Euclidean squared distance is 597 at the maximum, and thus, making the success or failure determination on the authentication based on only the distance results in the masquerade success. In contrast, checking whether the value is "0" or "1" for 114 pieces of elements allows the detection of the spoofing.

A case of D=2050, θ=600 (a case of D=4n+2)

In this case, (4θ−D)/3=116.6 is obtained. For the spoofing, due to the conditions that m is less than 116.6, and (D−m) is an integer divisible by 4, m=114 is obtained. In this case, a Euclidean squared distance is 598 at the maximum, and thus, making the success or failure determination on the authentication based on only the distance results in the spoofing success. In contrast, checking whether the value is "0" or "1" for 115 pieces of elements allows the detection of the spoofing.

A case of D=2051, θ=600 (a case of D=4n+3)

In this case, (4θ−D)/3=116.3 is obtained. For the spoofing, due to the conditions that m is less than 116.3, and (D−m) is an integer divisible by 4, m=115 is obtained. In this case, a Euclidean squared distance is 598 at the max$_i$mum, and thus, making the success or failure determination on the authentication based on only the distance results in the spoofing success. In contrast, checking whether the value is "0" or "1" for 116 pieces of elements allows the detection of the spoofing.

In this manner, in the second embodiment, encrypted elements of an appropriate number in a homomorphic encryption vector are decrypted, and whether each value obtained by the decryption is a binary is determined, thereby allowing a spoofing attack and an acquisition attack to a feature vector using an invalid vector such as wolf to be averted. In addition, decrypting only encrypted elements of the minimum number for averting the attack may limit an increase in the processing for the protection to the minimum.

In the foregoing, although the embodiments are exemplified, the configuration of each element indicated in the embodiments may be replaced with another element having a similar function. Moreover, another arbitrary component or step may be added. In addition, arbitrary two or more configurations (features) in the above-described embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by an authentication system that includes a terminal device and an encryption processing device, the method comprising:
   acquiring, by a sensor included in the terminal device, biometric information;
   generating, by a first processor included in the terminal device, a ciphertext from the acquired biometric information;
   receiving, by a second processor included in the encryption processing device, a request for an authentication from the first processor, the request including the generated ciphertext;
   acquiring a part of a plurality of encrypted elements included in the ciphertext, each of the plurality of encrypted elements being an encrypted element in which values of a plurality of elements in a multidimensional determination target vector are respectively encrypted by homomorphic encryption, in response to the request;
   decrypting the acquired part of the plurality of encrypted elements; and
   determining that the authentication is failed when at least one of values obtained by the decrypting is a value other than 0 and 1.

2. The method according to claim 1, further comprising:
   storing a comparison target ciphertext, the comparison target ciphertext corresponding to a comparison target vector in which a feature of biometric information on a specific user is represented by a plurality of elements each having a value of 0 or 1, and including a plurality of encrypted elements in which the plurality of elements are respectively encrypted by homomorphic encryption,
   wherein the acquiring includes
   generating, in response to an input of an authentication request including the ciphertext, an encrypted distance in which a distance between the multidimensional determination target vector and the comparison target vector is encrypted, based on the determination target ciphertext and the comparison target ciphertext, and
   the decrypting includes
   generating a value indicating the distance by decrypting the encrypted distance, and
   the determining includes:
   when the generated value indicating the distance is less than a threshold value and when each of all values obtained by the decrypting is 0 or 1, determining an authentication success for the authentication request; and
   when the generated value indicating the distance is greater than or equal to the threshold value or when at least one of the all values obtained by the decrypting is a value other than both of 0 and 1, determining an authentication failure for the authentication request.

3. The method according to claim 1, wherein the acquiring acquires four encrypted elements, as the part of the plurality of encrypted elements.

4. The method according to claim 1, wherein the acquiring acquires, when a number of the plurality of elements in the multidimensional determination target vector is D (D is an integer of 1 or more), the threshold value is θ (θ is a positive real number), as the part of the plurality of encrypted elements, encrypted elements a number of which corresponds to an minimum integer greater than (4θ−D)/3.

5. An authentication system comprising:
   a terminal device that includes:
     a sensor configured to acquire biometric information, and
     a first processor configured to generating a ciphertext from the acquired biometric information; and
   an encryption processing device that includes
     a second processor configured to execute a process including:
       receiving a request for an authentication from the first processor, the request including the generated ciphertext;
       acquiring a part of a plurality of encrypted elements included in the ciphertext, each of the plurality of encrypted elements being an encrypted element in which values of a plurality of elements in a multidimensional determination target vector are respectively encrypted by homomorphic encryption, in response to the request,
       decrypting the acquired part of the plurality of encrypted elements, and
       determining that the authentication is failed when at least one of values obtained by the decrypting is a value other than 0 and 1.

6. The apparatus according to claim 5, wherein the process further includes
   storing a comparison target ciphertext, the comparison target ciphertext corresponding to a comparison target vector in which a feature of biometric information on a specific user is represented by a plurality of elements each having a value of 0 or 1, and including a plurality of encrypted elements in which the plurality of elements are respectively encrypted by homomorphic encryption, wherein the acquiring includes generating, in response to an input of an authentication request including the ciphertext, an encrypted distance in which a distance between the multidimensional determination target vector and the comparison target vector is encrypted, based on the determination target ciphertext and the comparison target ciphertext, and the decrypting includes generating a value indicating the distance by decrypting the encrypted distance, and the determining includes:

when the generated value indicating the distance is less than a threshold value and when each of all values obtained by the decrypting is 0 or 1, determining an authentication success for the authentication request; and when the generated value indicating the distance is greater than or equal to the threshold value or when at least one of the all values obtained by the decrypting is a value other than both of 0 and 1, determining an authentication failure for the authentication request.

7. The apparatus according to claim 5, wherein the acquiring acquires four encrypted elements, as the part of the plurality of encrypted elements.

8. The apparatus according to claim 5, wherein the acquiring acquires, when a number of the plurality of elements in the multidimensional determination target vector is D (D is an integer of 1 or more), the threshold value is $\theta$ ($\theta$ is a positive real number), as the part of the plurality of encrypted elements, encrypted elements a number of which corresponds to an minimum integer greater than $(4\theta-D)/3$.

9. A non-transitory storage medium storing a program for causing a processor included in an encryption processing device to execute a process, the encryption processing device being coupled to a terminal device configured to acquire biometric information from a sensor included in the terminal device and generate a ciphertext from the acquired biometric information, the process comprising:

receiving a request for an authentication from the terminal device, the request including the generated ciphertext;

acquiring a part of a plurality of encrypted elements included in the ciphertext, each of the plurality of encrypted elements being an encrypted element in which values of a plurality of elements in a multidimensional determination target vector are respectively encrypted by homomorphic encryption, in response to the request;

decrypting the acquired part of the plurality of encrypted elements; and determining that the authentication is failed when at least one of values obtained by the decrypting is a value other than 0 and 1.

10. The non-transitory storage medium according to claim 9, wherein the process further comprises storing a comparison target ciphertext, the comparison target ciphertext corresponding to a comparison target vector in which a feature of biometric information on a specific user is represented by a plurality of elements each having a value of 0 or 1, and including a plurality of encrypted elements in which the plurality of elements are respectively encrypted by homomorphic encryption, wherein the acquiring includes generating, in response to an input of an authentication request including the ciphertext, an encrypted distance in which a distance between the multidimensional determination target vector and the comparison target vector is encrypted, based on the determination target ciphertext and the comparison target ciphertext, and the decrypting includes generating a value indicating the distance by decrypting the encrypted distance, and the determining includes:

when the generated value indicating the distance is less than a threshold value and when each of all values obtained by the decrypting is 0 or 1, determining an authentication success for the authentication request; and when the generated value indicating the distance is greater than or equal to the threshold value or when at least one of the all values obtained by the decrypting is a value other than both of 0 and 1, determining an authentication failure for the authentication request.

11. The non-transitory storage medium according to claim 9, wherein the acquiring acquires four encrypted elements, as the part of the plurality of encrypted elements.

12. The non-transitory storage medium according to claim 9, wherein the acquiring acquires, when a number of the plurality of elements in the multidimensional determination target vector is D (D is an integer of 1 or more), the threshold value is $\theta$ ($\theta$ is a positive real number), as the part of the plurality of encrypted elements, encrypted elements a number of which corresponds to an minimum integer greater than $(4\theta-D)/3$.

* * * * *